US011767070B2

(12) United States Patent
Cheong et al.

(10) Patent No.: US 11,767,070 B2
(45) Date of Patent: Sep. 26, 2023

(54) AGRICULTURAL OPERATION VEHICLE

(71) Applicant: LS MTRON LTD., Anyang-si (KR)

(72) Inventors: Seung Ho Cheong, Anyang-si (KR); Jang Hyun Kim, Anyang-si (KR); Byung Dal Choi, Anyang-si (KR); Jong Uk Park, Anyang-si (KR); Eun Hong Kim, Anyang-si (KR)

(73) Assignee: LS MTRON LTD., Anyang-Si (KR)

( * ) Notice: Subject to any disclaimer, the term of this patent is extended or adjusted under 35 U.S.C. 154(b) by 614 days.

(21) Appl. No.: 16/981,576

(22) PCT Filed: Nov. 28, 2019

(86) PCT No.: PCT/KR2019/016570
§ 371 (c)(1),
(2) Date: Sep. 16, 2020

(87) PCT Pub. No.: WO2020/149519
PCT Pub. Date: Jul. 23, 2020

(65) Prior Publication Data
US 2021/0070383 A1  Mar. 11, 2021

(30) Foreign Application Priority Data

Jan. 15, 2019 (KR) .................... 10-2019-0005379
Nov. 8, 2019 (KR) .................... 10-2019-0142367
(Continued)

(51) Int. Cl.
*B62D 49/06* (2006.01)
*A01D 69/08* (2006.01)
(Continued)

(52) U.S. Cl.
CPC ......... *B62D 49/0692* (2013.01); *A01D 69/08* (2013.01); *B60K 23/02* (2013.01); *F16D 11/00* (2013.01)

(58) Field of Classification Search
CPC .... B62D 49/0692; A01D 69/08; B60K 23/02; F16D 11/00
(Continued)

(56) References Cited

U.S. PATENT DOCUMENTS 4,505,364 A * 3/1985 Goucher ........... B60W 30/1819
192/3.58
5,002,166 A * 3/1991 Leigh-Monstevens .....................
B60W 10/06
60/567

(Continued)

FOREIGN PATENT DOCUMENTS

JP  3020553 U  2/1996
KR 100300719 B1  7/1999
(Continued)

OTHER PUBLICATIONS

International Search Report for related International Application No. PCT/KR2019/016570; report dated Jul. 23, 2020; (5 pages).
Written Opinion for related International Application No. PCT/KR2019/016570; report dated Jul. 23, 2020; (5 pages).

*Primary Examiner* — Ha Dinh Ho
(74) *Attorney, Agent, or Firm* — K&L Gates LLP

(57) ABSTRACT

The present disclosure relates to an agricultural operation vehicle comprising a body; a transmission; a clutch pedal; a hand lever; a clutch switch; a clutch link unit connected to the clutch such that the transmission is fastened and unfastened from the clutch; a clutch pedal link unit coupled to the clutch link unit to rotate around the connecting shaft; a pedal link unit connected to the clutch pedal link unit and the clutch pedal so as to rotate the clutch link unit around the connecting shaft responsive to manipulation of the clutch pedal; a clutch switch link unit coupled to the clutch link unit to rotate around the connecting shaft with the clutch link unit; and an operation unit for rotating the clutch switch link
(Continued)

unit around the connecting shaft such that the clutch link unit is rotated around the connecting shaft responsive to manipulation of the clutch switch.

20 Claims, 32 Drawing Sheets

(30) Foreign Application Priority Data

Nov. 8, 2019 (KR) .................. 10-2019-0142375
Nov. 8, 2019 (KR) .................. 10-2019-0142382

(51) Int. Cl.
*B60K 23/02* (2006.01)
*F16D 11/00* (2006.01)

(58) Field of Classification Search
USPC ........................................ 74/733.1
See application file for complete search history.

(56) References Cited

U.S. PATENT DOCUMENTS

| | | | | |
|---|---|---|---|---|
| 5,096,031 A | * | 3/1992 | Cortesi | B60W 30/1819 74/473.23 |
| 5,135,091 A | * | 8/1992 | Albers | F16D 48/066 192/85.48 |
| 5,507,373 A | * | 4/1996 | Nguyen | B60W 30/1819 192/82 P |
| 6,170,624 B1 | * | 1/2001 | Arai | F16D 48/064 192/3.62 |
| 8,708,121 B2 | * | 4/2014 | Caputo | F16D 28/00 192/84.1 |

FOREIGN PATENT DOCUMENTS

KR 20020035504 A 5/2002
KR 100630251 B1 10/2006

\* cited by examiner

AGRICULTURAL OPERATION VEHICLE

CROSS-REFERENCE TO RELATED APPLICATIONS

The present application is a National Stage of International Application No. PCT/KR2019/016570, filed Nov. 28, 2019, which claims priority to Korean Application No. 10-2019-0005379, filed Jan. 15, 2019; Korean Application No. 10-2019-0142367 filed Nov. 8, 2019; Korean Application No. 10-2019-0142375 filed Nov. 8, 2019; and Korean Application No. 10-2019-0142382 filed Nov. 8, 2019, the disclosures of which are incorporated herein by reference.

FIELD

The present disclosure relates to an agricultural vehicle used to grow crops necessary for human life by using land.

BACKGROUND

Agricultural vehicles are used to grow crops necessary for human life by using land. Examples of the agricultural vehicles include a combine harvester, a tractor, a rice transplanter, and the like. The combine harvester performs tasks of reaping and threshing crops such as rice, barley, wheat, and soybeans. The tractor uses traction to perform a task necessary to grow crops. The rice transplanter performs a task of transplanting rice, which is raised in a rice seedbed or a seedling tray, to a paddy field.

There is a need to adjust the torque, speed, or the like of the agricultural vehicle during the operational process thereof. To this end, the agricultural vehicle includes a transmission.

The transmission includes a clutch configured to selectively transmit drive. The clutch transmits the drive transmitted from an engine or a front transmission part to an axle or a rear transmission part. When the driver does not step on a clutch pedal provided in a driver's seat, the clutch transmits the drive transmitted from the engine or front transmission part to the axle or rear transmission part. In this case, the clutch is in an engaged state. When the driver steps on the clutch pedal with his or her foot, the clutch does not transmit the drive transmitted from the engine or front transmission part to the axle or rear transmission part. In this case, the clutch is in a disengaged state.

In the agricultural vehicle according to the related art, a shifting operation is performed by, for example, the driver adjusting the number of gear stages while stepping on the clutch pedal with his or her foot. Accordingly, the agricultural vehicle according to the related art has a problem of causing inconvenience and fatigue to the driver because the driver should repeatedly step on the clutch pedal to shift.

SUMMARY

The present disclosure is directed to providing an agricultural vehicle capable of reducing inconvenience and fatigue of the driver during a shifting process.

In order to achieve the above objective, the present disclosure may include the following configurations.

An agricultural vehicle according to the present disclosure may include: a vehicle main body configured to support an engine of the agricultural vehicle; a transmission coupled to the vehicle main body and configured to perform shifting with respect to drive generated by the engine; a clutch pedal provided in a driver's seat of the vehicle main body so that the driver is able to manipulate the clutch pedal with his or her feet; a hand lever provided in the driver's seat so that the driver is able to manipulate the hand lever with his or her hand; a clutch switch coupled to the hand lever; a clutch link part configured to be rotatable about a connection shaft and connected to a clutch of the transmission so as to be engaged to and disengaged from the clutch; a clutch pedal link part coupled to the clutch link part so as to rotate together with the clutch link part about the connection shaft; a pedal link part connected to each of the clutch pedal link part and the clutch pedal so as to rotate the clutch link part about the connection shaft as the clutch pedal is manipulated; a clutch switch link part coupled to the clutch link part so as to rotate together with the clutch link part about the connection shaft; and an operation part configured to rotate the clutch switch link part about the connection shaft so as to rotate the clutch link part about the connection shaft as the clutch switch is manipulated.

The agricultural vehicle according to the present disclosure may include a pedal connecting part configured to connect the clutch pedal link part and the pedal link part so that, when the clutch switch is manipulated, the clutch pedal link part rotates independently of the pedal link part and, when the clutch pedal is manipulated, the clutch pedal link part interlocks with the pedal link part and rotates.

The agricultural vehicle according to the present disclosure may include a switch connecting part configured to connect the clutch switch link part and the operation part so that, when the clutch pedal is manipulated, the clutch switch link part rotates independently of the operation part and, when the clutch switch is manipulated, the clutch switch link part interlocks with the operation part and rotates.

According to the present disclosure, the following advantageous effects can be achieved.

The present disclosure is implemented to allow the driver to engage and disengage a clutch by manipulation using his or her foot or hand. Therefore, the present disclosure can reduce fatigue caused to the driver due to shifting and improve convenience for the driver.

The present disclosure is implemented so that a clutch pedal does not rotate when the driver manipulates a clutch switch with his or her hand without stepping on the clutch pedal with his or her foot. In this way, the present disclosure can prevent the driver from being injured due to an unintended rotation of the clutch pedal. Therefore, the present disclosure is implemented to provide the driver with convenience in shifting manipulation using the clutch switch and ensure safety for the driver during the shifting process using the clutch switch.

The present disclosure is implemented so that, when the driver manipulates the clutch pedal by stepping thereon with his or her foot, a clutch switch link part is able to rotate smoothly without being obstructed by an operation part. Therefore, the present disclosure is implemented to provide the driver with convenience in the shifting manipulation using the clutch switch and also allow the clutch to be smoothly controlled through manipulation of the clutch pedal.

DETAILED DESCRIPTION

Hereinafter, exemplary embodiments of an agricultural vehicle according to the present disclosure will be described in detail with reference to the accompanying drawings.

Figure 1:
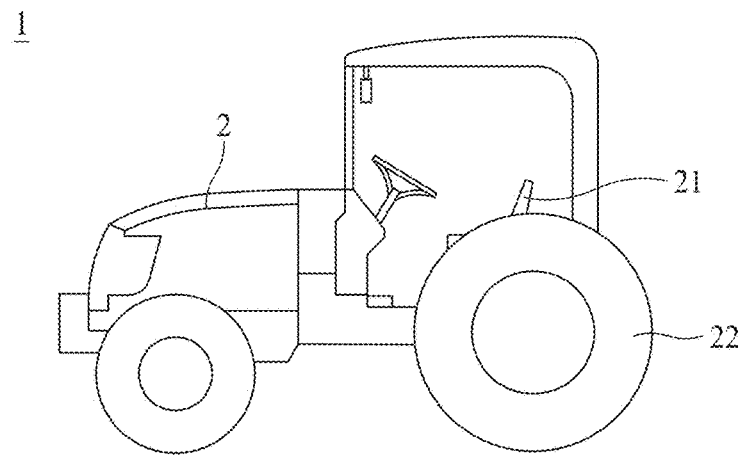
FIG. 1 is a schematic side view illustrating an example of an agricultural vehicle according to the present disclosure.
Figure 2:
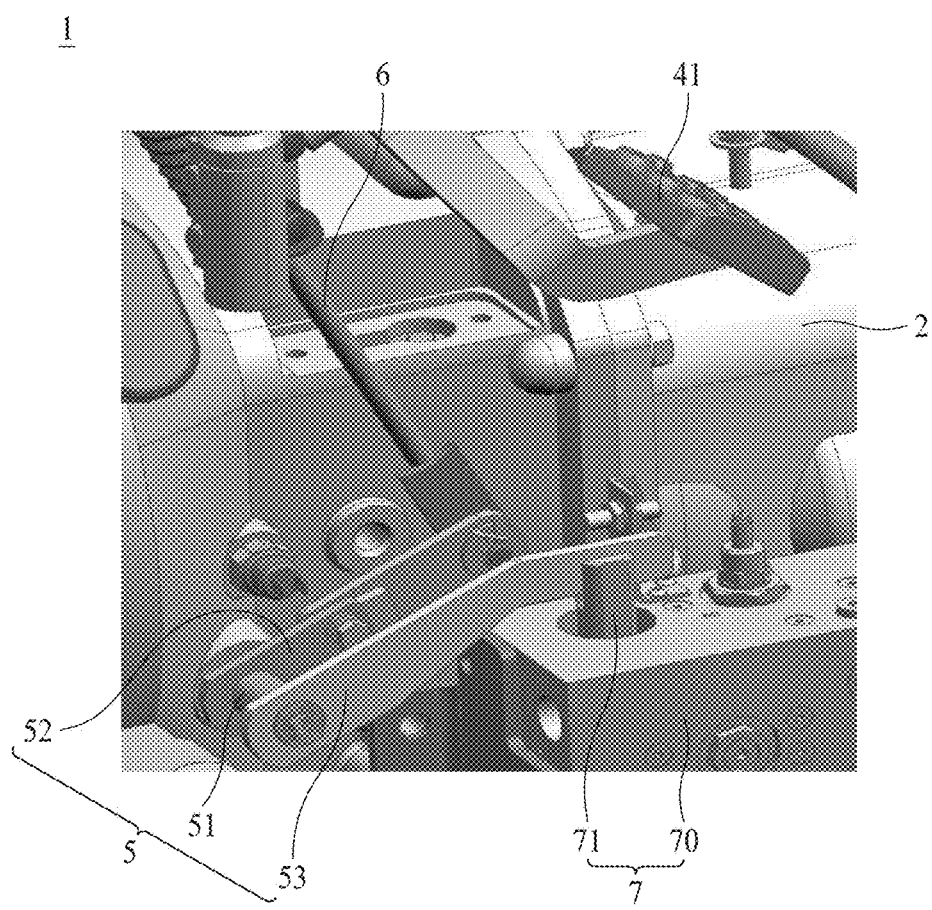
FIG. 2 is a schematic perspective view illustrating a portion of the agricultural vehicle according to the present disclosure.
Figure 3:
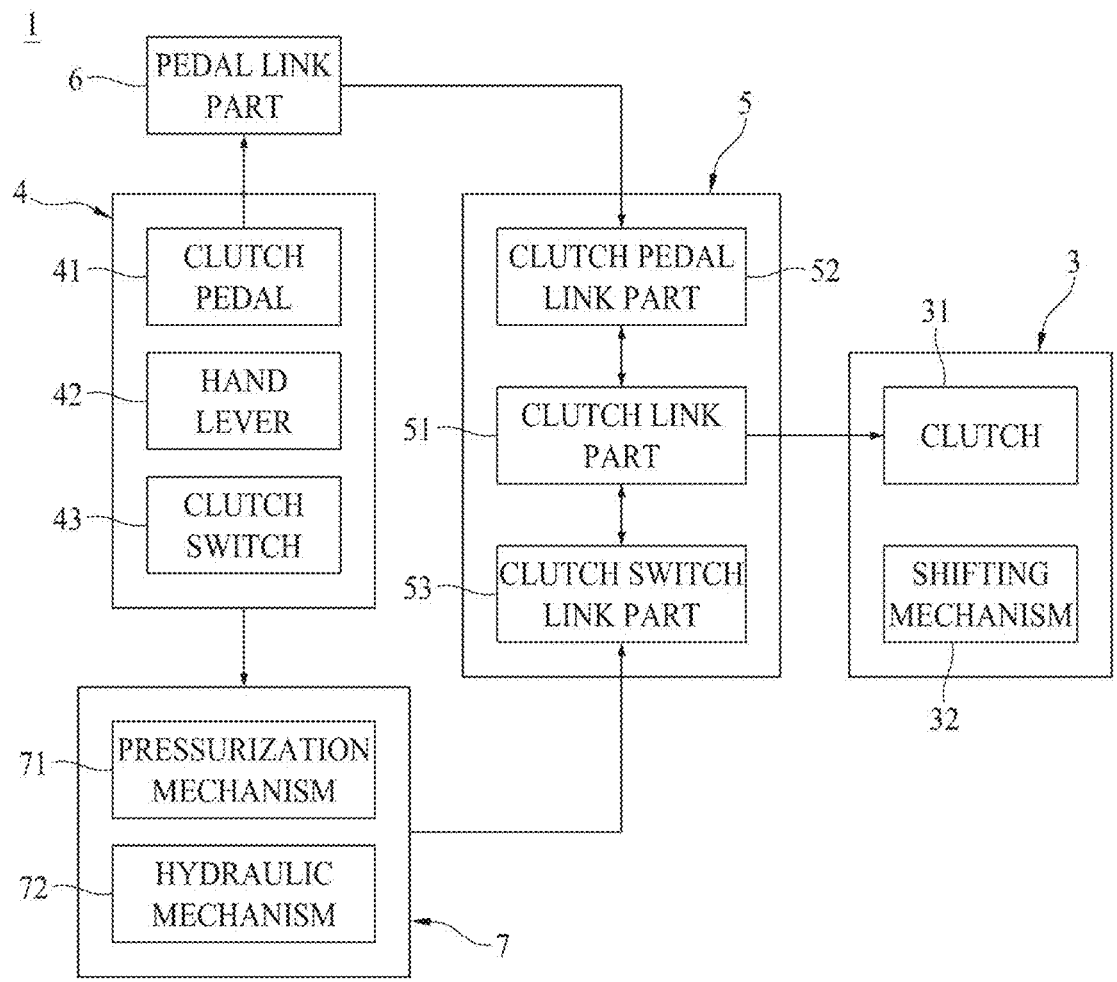
FIG. 3 is a schematic block diagram of the agricultural vehicle according to the present disclosure.
Figure 4:
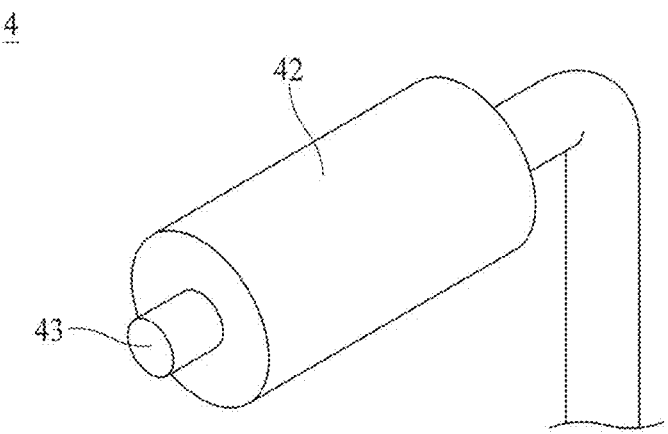
FIG. 4 is a schematic perspective view illustrating an example of a hand lever to which a clutch switch is coupled.

Referring to FIGS. 1 to 3, an agricultural vehicle 1 according to the present disclosure is used to grow crops necessary for human life by using land. Examples of the agricultural vehicle 1 according to the present disclosure include a tractor, a combine harvester, a rice transplanter, and the like.

The agricultural vehicle 1 according to the present disclosure may include a vehicle main body 2 configured to support an engine (not illustrated), a transmission 3 configured to perform shifting with respect to drive generated by the engine, a manipulation part 4 manipulated to control the transmission 3, a link part 5 operated to be engaged to and disengaged from a clutch 31 of the transmission 3 as the manipulation part 4 is manipulated, a pedal link part 6 configured to move the link part 5 as the manipulation part 4 is manipulated, and an operation part 7 configured to move the link part 5 as the manipulation part 4 is manipulated.

The manipulation part 4 may include a clutch pedal 41 which the driver is able to manipulate with his or her foot, a hand lever 42 which the driver is able to manipulate with his or her hand, and a clutch switch 43 coupled to the hand lever 42. When the driver manipulates the clutch pedal 41 with his or her foot, a manipulation force may be transmitted to the clutch 31 through the pedal link part 6 and the link part 5. Accordingly, the engagement to and disengagement from the clutch 31 may be performed by the foot of the driver. When the driver manipulates the clutch switch 43 with his or her hand, a manipulation signal may be generated by the clutch switch 43, the operation part 7 may be operated corresponding to the generated manipulation signal, and an operation force of the operation part 7 may be transmitted to the clutch 41 through the link part 5. Accordingly, the engagement to and disengagement from the clutch 31 may be performed by the hand of the driver.

In this way, the agricultural vehicle 1 according to the present disclosure is implemented to allow the driver to engage and disengage the clutch 31 using his or her foot or hand. Therefore, the agricultural vehicle 1 according to the present disclosure may reduce fatigue caused to the driver due to shifting and improve convenience for the driver.

Hereinafter, the vehicle main body 2, the transmission 3, the manipulation part 4, the link part 5, the pedal link part 6, and the operation part 7 will be described in detail with reference to the accompanying drawings.

Referring to FIGS. 1 to 3, the vehicle main body 2 supports the engine. In the vehicle main body 2, the engine, the transmission 3, the manipulation part 4, the link part 5, the pedal link part 6, and the operation part 7 may be coupled. In the vehicle main body 2, a driver's seat 21 is provided for the driver to get in. A wheel 22 may be coupled to the vehicle main body 2. When the drive generated by the engine is transmitted to the wheel 22 via the transmission 3, the vehicle main body 2 may travel in a travel direction as the wheel 22 rotates.

Referring to FIGS. 1 to 3, the transmission 3 performs shifting with respect to the drive transmitted from the engine. As the transmission 3 performs shifting, a travel speed at which the vehicle main body 2 travels may be changed.

The transmission 3 may include the clutch 31. The clutch 31 selectively transmits drive. The clutch 31 may selectively transmit the drive transmitted from the engine to at least one of a plurality of shifting mechanisms 32 of the transmission 3. The clutch 31 may selectively transmit the drive using friction between a clutch plate (not illustrated) and a flywheel (not illustrated). The clutch 31 may be implemented as a dry clutch. The clutch 31 may also be implemented as a dry single-plate clutch.

Referring to FIGS. 1 to 4, the manipulation part 4 is for controlling the transmission 3. The manipulation part 4 may be disposed in the driver's seat 21. Accordingly, the driver may control the transmission 3 by getting in the driver's seat 21 and manipulating the manipulation part 4.

The manipulation part 4 may include the clutch pedal 41, the hand lever 42, and the clutch switch 43.

The clutch pedal 41 is for controlling the clutch 31 by manipulation with a foot of the driver. The clutch pedal 41 may be coupled to the vehicle main body 2. The clutch pedal 41 may be disposed at a portion below the driver's seat 21. When the driver steps on the clutch pedal 41 with his or her foot, the clutch pedal 41 may rotate about a pedal shaft (not illustrated) and operate the link part 5.

The hand lever 42 is for controlling the transmission 3 by manipulation by a hand of the driver. The hand lever 42 may be coupled to the vehicle main body 2. When the driver moves the hand lever 42 with his or her hand, the transmission 3 may change at least one of the travel direction and the travel speed according to the direction in which the hand lever 42 has been moved and the distance at which the hand lever 42 has been moved. A plurality of hand levers 42 may be disposed in the driver's seat 21. Although not illustrated, the hand levers 42 may include a main shifting lever for controlling a main transmission part of the transmission 3, a sub-shifting lever for controlling a sub-transmission part of the transmission 3, an ultra-low speed lever for controlling an ultra-low speed transmission part of the transmission 3, a forward-reverse lever for controlling a forward-reverse transmission part of the transmission 3, and the like.

The clutch switch 43 is for controlling the clutch 31 by manipulation by a hand of the driver. When the driver presses the clutch switch 43 with his or her hand, the clutch switch 43 may operate the operation part 7 and operate the link part 5 through the operation part 7. The clutch switch 43 may also operate the operation part 7 differently according to the number of times the clutch switch 43 is pressed by the driver. The clutch switch 43 may operate the operation part 7 using an electrical signal. The clutch switch 43 may also operate the operation part 7 using a hydraulic pressure using a working fluid, interlocking through a link member, and the like.

The clutch switch 43 may be coupled to the hand lever 42. Accordingly, the driver may manipulate the clutch switch 43 while holding the hand lever 42 in order to manipulate the transmission 3. For example, the driver may press the clutch switch 43 while holding the hand lever 42 in order to disengage the clutch 31 and then move the hand lever 42 in order to control the shifting mechanism 32. Therefore, the agricultural vehicle 1 according to the present disclosure may reduce fatigue caused to the driver due to shifting and improve convenience for the driver. Also, by being implemented so that the driver may control the clutch 31 and the shifting mechanism 32 while holding the hand lever 42, the agricultural vehicle 1 according to the present disclosure may improve ease of manipulation for shifting.

When the manipulation part 4 includes the plurality of hand levers 42, the clutch switch 43 may be coupled to at least one of the hand levers 42. For example, the clutch switch 43 may be coupled to at least one of the main shifting lever, the sub-shifting lever, the ultra-low speed lever, and the forward-reverse lever.

Referring to FIGS. 1 to 4, the link part 5 operates so that engagement to and disengagement from the clutch 31 occur as the manipulation part 4 is manipulated. The link part 5 may be connected to each of the pedal link part 6, the operation part 7, and the clutch 31. When the clutch pedal 41 is manipulated, the link part 5 may operate by interlocking with movement of the pedal link part 6 and engage or disengage the clutch 31. When the clutch switch 43 is manipulated, the link part 5 may operate by interlocking with movement of the operation part 7 and engage or disengage the clutch 31.

Referring to FIGS. 1 to 5, the link part 5 may include a clutch link part 51.

The clutch link part 51 is for engaging or disengaging the clutch 31. The clutch link part 51 may be coupled to the vehicle main body 2 so as to be rotatable about a connection shaft 51a. The clutch link part 51 may be connected to the clutch 31. Accordingly, the clutch link part 51 may rotate about the connection shaft 51a and engage or disengage the clutch 31. Hereinafter, unless otherwise stated, rotation of the clutch link part 51 refers to rotation thereof about the connection shaft 51a.

Figure 5:
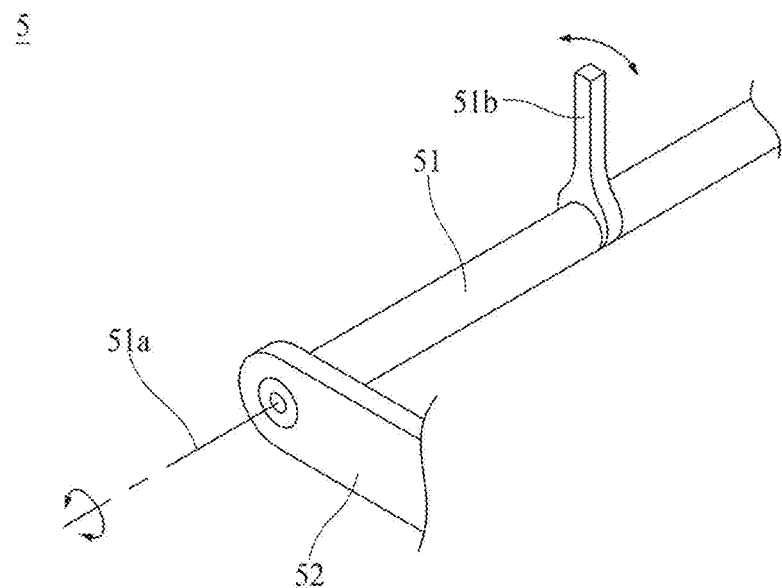
FIG. 5 is a schematic perspective view illustrating a clutch link part, a clutch operating member, and a clutch pedal link part.

The clutch link part 51 may be implemented to engage or disengage the clutch 31 through a clutch operating member 51b (see FIG. 5). The clutch operating member 51b may be coupled to the clutch link part 51 so as to rotate together with the clutch link part 51. The clutch operating member 51b may protrude from the clutch link part 51. By providing a pressing force to the clutch 31 or releasing the pressing force from the clutch 31 according to a direction in which the clutch link part 51 rotates, the clutch operating member 51b may engage or disengage the clutch 31. Although not illustrated, by providing a pressing force to a hydraulic means that provides a hydraulic pressure to the clutch 31, the clutch operating member 51b may also operate the clutch 31.

Referring to FIGS. 2 to 7, the link part 5 may include a clutch pedal link part 52.

The clutch pedal link part 52 is coupled to the clutch link part 51. The clutch pedal link part 52 may rotate together with the clutch link part 51 about the connection shaft 51a.

Hereinafter, unless otherwise stated, rotation of the clutch pedal link part 52 refers to rotation thereof about the connection shaft 51a.

The clutch pedal link part 52 may be connected to each of the clutch link part 51 and the pedal link part 6. When the pedal link part 6 moves as the clutch pedal 41 is manipulated, the clutch pedal link part 52 may rotate by interlocking with the movement of the pedal link part 6 and rotate the clutch link part 51.

Figure 6:
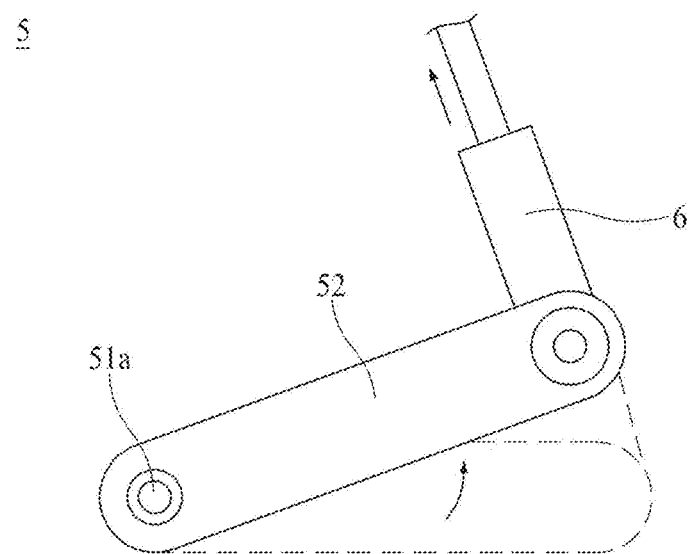
FIGS. 6 and 7 are schematic side views for describing an operational relationship between a pedal link part and the clutch pedal link part.

For example, when the driver steps on the clutch pedal 41 with his or her foot, the clutch pedal 41 may rotate about the pedal shaft due to a force by which the driver steps on the clutch pedal 41. In this case, as illustrated in FIG. 6, the pedal link part 6 may be pulled upward by the clutch pedal 41. Accordingly, the clutch pedal link part 52 may rotate counterclockwise and rotate the clutch link part 51 and the clutch operating member 51b (see FIG. 5) counterclockwise. The clutch operating member 51b (see FIG. 5) may provide a pressing force to the clutch 31 (see FIG. 3) while rotating counterclockwise. Accordingly, the clutch 31 (see FIG. 3) may be disengaged.

Figure 7:
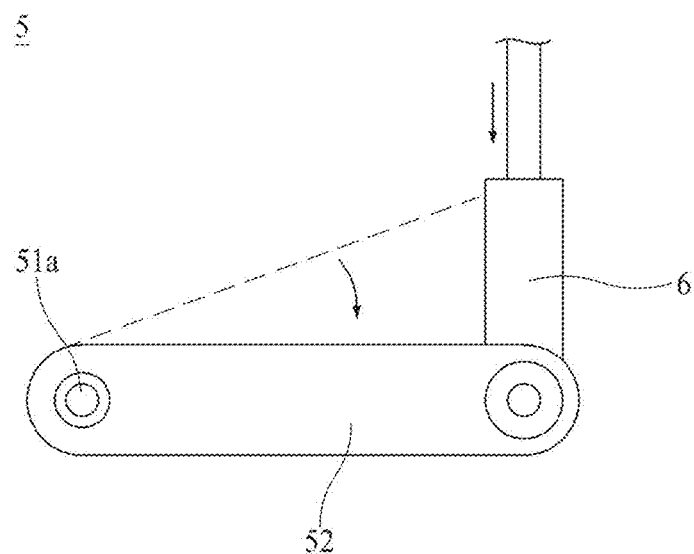

For example, when the driver releases his or her foot from the clutch pedal 41, a force by which the clutch pedal 41 pulls the pedal link part 6 upward is released. In this case, as illustrated in FIG. 7, the clutch operating member 51b (see FIG. 5) may rotate clockwise due to a force of the clutch 31 (see FIG. 3) attempting to be engaged that is generated by the clutch 31 (see FIG. 3) itself. Accordingly, the clutch link part 51 and the clutch pedal link part 52 may rotate clockwise and pull the pedal link part 6 downward. Accordingly, the clutch 31 (see FIG. 3) may be engaged, and the clutch pedal 41 may rotate about the pedal shaft and return to its original position.

The clutch pedal link part 52 may have one side connected to the clutch link part 51 and the other side connected to the pedal link part 6. The connection shaft Ma may be disposed at the one side of the clutch pedal link part 52.

Referring to FIGS. 3, 5, and 8 to 10, the link part 5 may include a clutch switch link part 53.

The clutch switch link part 53 is connected to each of the clutch link part 51 and the operation part 7. The clutch switch link part 53 may be coupled to the clutch link part 51 so as to rotate together with the clutch link part 51. The clutch switch link part 53 may rotate about the connection shaft 51a. Hereinafter, unless otherwise stated, rotation of the clutch switch link part 53 refers to rotation thereof about the connection shaft Ma. When the operation part 7 operates as the clutch switch 43 is manipulated, the clutch switch link part 53 may rotate by interlocking with the operation of the operation part 7 and rotate the clutch link part 51.

Figure 8:
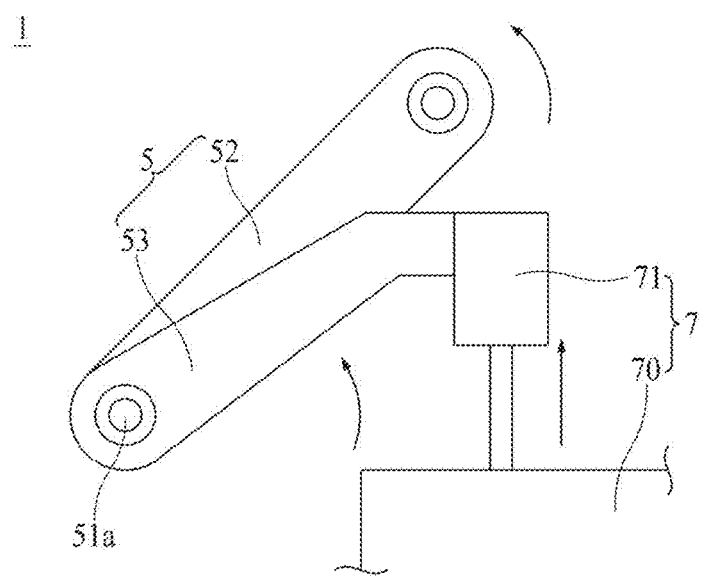
FIGS. 8 and 9 are schematic side views for describing an operational relationship among a clutch switch link part, an operation part, and the clutch pedal link part.

For example, when the driver presses the clutch switch 43 with his or her hand, as illustrated in FIG. 8, the operation part 7 may operate so that the clutch switch link part 53 rotates counterclockwise. The clutch switch link part 53 may rotate the clutch link part 51 and the clutch operating member 51b (see FIG. 5) counterclockwise while rotating counterclockwise. Therefore, the clutch 31 (see FIG. 3) may be disengaged.

Figure 9:
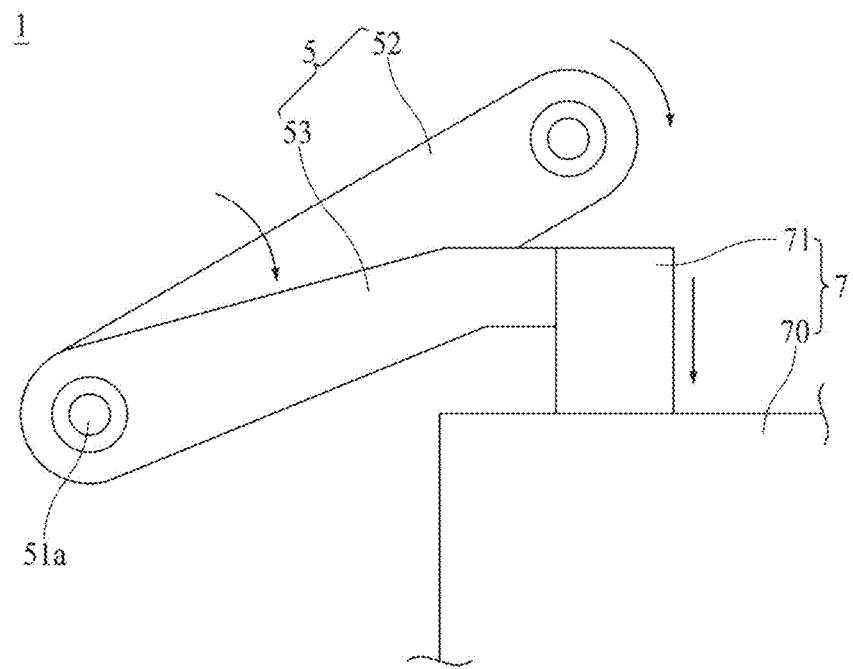
Figure 10:
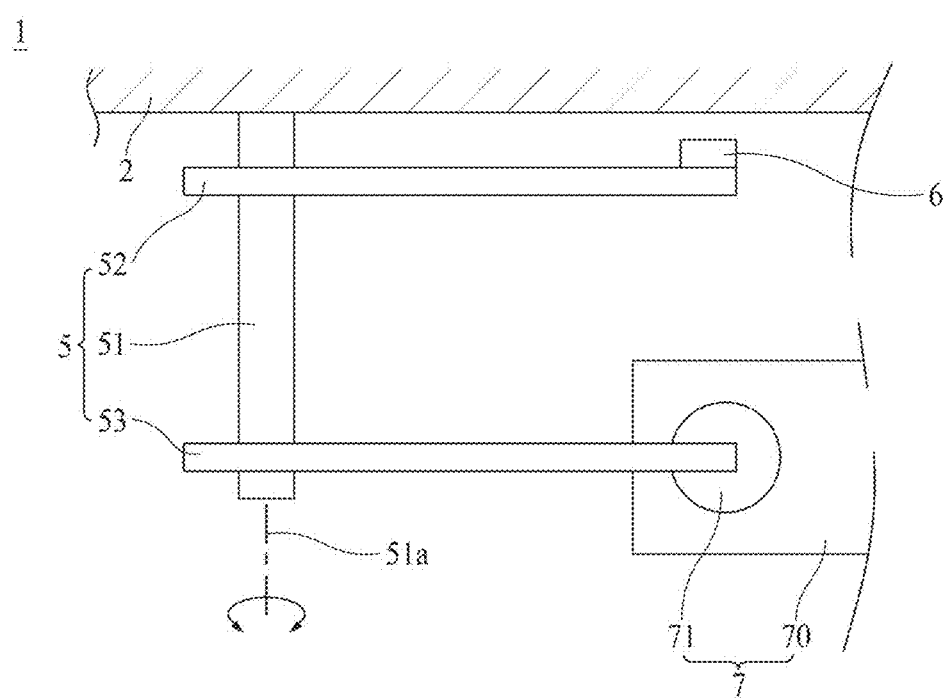
FIG. 10 is a schematic plan view for describing an arrangement relationship between a link part and the operation part.

For example, when the driver releases his or her hand from the clutch switch 43, as illustrated in FIG. 9, a force by which the operation part 7 rotates the clutch switch link part 53 counterclockwise is released. The clutch operating member 51b (see FIG. 5) may rotate clockwise due to a force of the clutch 31 (see FIG. 3) attempting to be engaged that is generated by the clutch 31 (see FIG. 3) itself. Accordingly, the clutch link part 51 and the clutch switch link part 53 may rotate clockwise. Therefore, the clutch 31 (see FIG. 3) may be engaged.

The clutch switch link part 53 may have one side connected to the clutch link part 51 and the other side connected to the operation part 7. The connection shaft 51a may be disposed at the one side of the clutch switch link part 53.

The clutch switch link part 53 may be coupled to the clutch link part 51 so as to be disposed outward from the clutch pedal link part 52 in a width direction. The width direction refers to an axial direction which is perpendicular to the travel direction in which the vehicle main body 2 travels. In this case, the clutch switch link part 53 may be detachably coupled to the clutch link part 51. Accordingly, the agricultural vehicle 1 according to the present disclosure is implemented so that the clutch switch link part 53 may be separated while the clutch pedal link part 52 is coupled to the vehicle main body 2. Therefore, the agricultural vehicle 1 according to the present disclosure may improve ease of separating and installing the clutch switch link part 53 and reduce the working time taken for separating and installing the clutch switch link part 53.

Referring to FIGS. 3 and 5 to 7, the pedal link part 6 is connected to each of the clutch pedal link part 52 and the clutch pedal 41. The pedal link part 6 may rotate the clutch pedal link part 52 by moving as the clutch pedal 41 is manipulated.

Referring to FIGS. 3 and 8 to 10, the operation part 7 rotates the clutch switch link part 53 as the clutch switch 43 is manipulated. The operation part 7 may also be implemented to selectively operate according to whether the clutch switch 43 is manipulated by using an electrical signal. The operation part 7 may also be implemented to selectively operate according to whether the clutch switch 43 is manipulated by using a hydraulic pressure using a working fluid, interlocking through a link member, and the like.

The operation part 7 may be disposed below the other side of the clutch switch link part 53. In this case, the operation part 7 may rotate the clutch switch link part 53 by operating to lift and lower the other side of the clutch switch link part 53.

The operation part 7 may be coupled to the vehicle main body 2 so as to be disposed outward from the vehicle main body 2 in the width direction. The operation part 7 may be detachably coupled to the vehicle main body 2. Accordingly, the agricultural vehicle 1 according to the present disclosure may improve ease of separating and installing the operation part 7 and reduce the working time taken for separating and installing the operation part 7.

The operation part 7 may include a pressurization mechanism 71 and a hydraulic mechanism 72.

The pressurization mechanism 71 is lifted and lowered according to whether the clutch switch 51 is manipulated. The clutch switch link part 53 and the clutch link part 51 may rotate as the pressurization mechanism 71 is lifted and lowered. The pressurization mechanism 71 may be coupled to an operation main body 70 so as to be able to be lifted and lowered. The operation main body 70 is coupled to the vehicle main body 2. The operation main body 70 may be disposed below the clutch switch link part 53.

The hydraulic mechanism 72 lifts and lowers the pressurization mechanism 71 using a working fluid. The working fluid may be oil. The hydraulic mechanism 72 may lift the pressurization mechanism 71 by supplying the working fluid toward the pressurization mechanism 71. The hydraulic mechanism 72 may lower the pressurization mechanism 71 by discharging the working fluid from the pressurization mechanism 71. The hydraulic mechanism 72 may lift or lower the pressurization mechanism 71 according to whether the clutch switch 43 is manipulated. In this case, the hydraulic mechanism 72 may operate according to whether the clutch switch 43 is manipulated by using an electrical signal, a hydraulic pressure using a working fluid, interlocking through a link member, and the like. The operation part 7 may be implemented as an actuator. The hydraulic mechanism 72 may be coupled to the operation main body 70.

Referring to FIGS. 3 and 6 to 20, the agricultural vehicle 1 according to the present disclosure may include a pedal connecting part 8.

The pedal connecting part 8 connects the clutch pedal link part 52 and the pedal link part 6 so that the clutch pedal link part 52 and the pedal link part 6 interlock selectively according to which of the clutch pedal 41 and the clutch switch 43 is manipulated. When the clutch switch 43 is manipulated, the pedal connecting part 8 may connect the clutch pedal link part 52 and the pedal link part 6 so that the clutch pedal link part 52 rotates independently of the pedal link part 6. When the clutch pedal 41 is manipulated, the pedal connecting part 8 may connect the clutch pedal link part 52 and the pedal link part 6 so that the clutch pedal link part 52 interlocks with the pedal link part 6 and rotates.

Accordingly, the agricultural vehicle 1 according to the present disclosure may achieve the following effects.

First, in a comparative example in which the clutch pedal link part 52 always interlocks with the pedal link part 6 and rotates, when the clutch switch 43 is manipulated, the pedal link part 6 always moves as the clutch pedal link part 52 rotates. Accordingly, in the comparative example, even when the driver manipulates the clutch switch 43 by his or her hand without stepping on the clutch pedal 41 with his or her foot, the clutch pedal 41 rotates. Therefore, in the comparative example, because the clutch pedal 41 rotates even when the driver has not manipulated the clutch pedal 41 with his or her foot, there is a concern that the driver may be injured due to colliding with the clutch pedal 41 when the clutch pedal 41 rotates, and there may be a problem in which an unintended operation failure occurs due to the clutch pedal 41 interfering with a foot or the like of the driver.

Unlike the above, the agricultural vehicle 1 according to the present disclosure is implemented so that the clutch pedal link part 52 rotates independently of the pedal link part 6 when the clutch switch 43 is manipulated using the pedal connecting part 8. Accordingly, when the driver manipulates the clutch switch 43 by his or her hand without stepping on the clutch pedal 41 with his or her foot, the clutch pedal 41 does not rotate in the agricultural vehicle 1 according to the present disclosure. Therefore, the agricultural vehicle 1 according to the present disclosure may prevent the driver from being injured due to rotation of the clutch pedal 41 and prevent an unintended operation failure from occurring due to the clutch pedal 41 interfering with a foot or the like of the driver. Accordingly, the agricultural vehicle 1 according to the present disclosure is implemented to provide the driver with convenience in shifting manipulation using the clutch switch 43 and ensure safety for the driver during the shifting process using the clutch switch 43.

Here, the agricultural vehicle 1 according to the present disclosure may include the pedal connecting part 8 according to various embodiments. Hereinafter, the pedal connecting part 8 according to various embodiments will be described in detail with reference to the accompanying drawings.

Referring to FIGS. 3 and 6 to 14, the pedal connecting part 8 according to a first embodiment may include a pedal hole 81 and a pedal connecting member 82.

Figure 11:
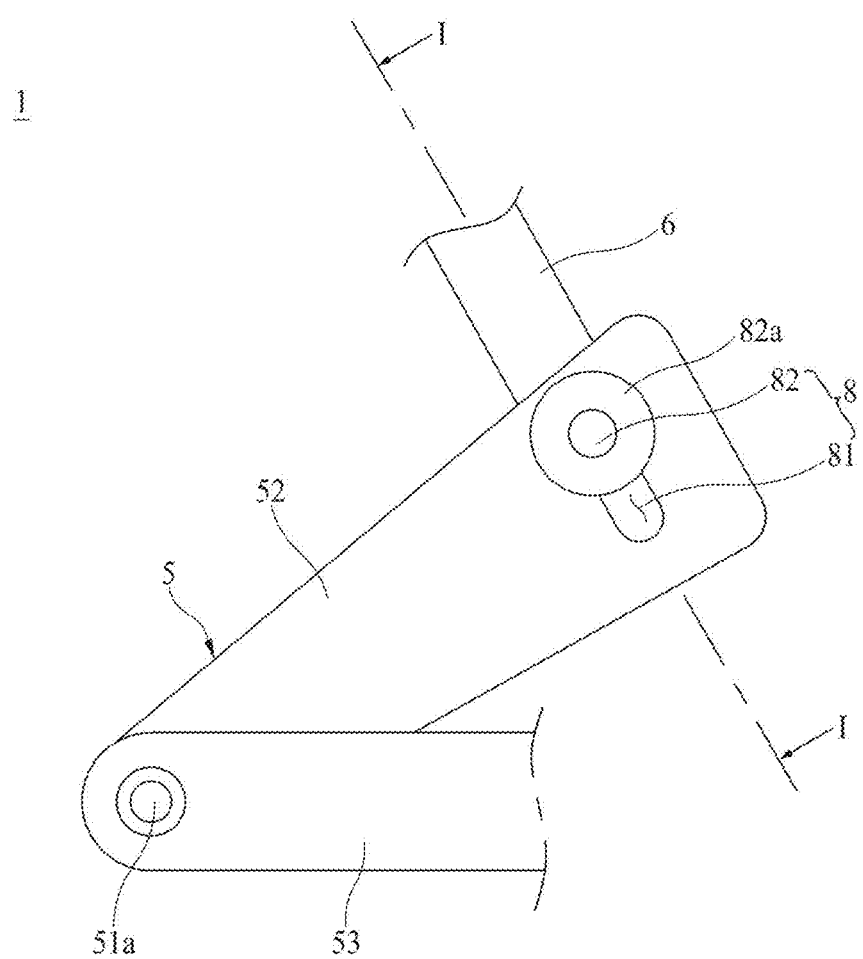
FIG. 11 is a schematic side view for describing a pedal connecting part according to a first embodiment.

The pedal hole 81 is formed in the clutch pedal link part 52. The pedal hole 81 may be formed in the shape of a slot in a direction in which the clutch pedal link part 52 rotates about the connection shaft 51a. For example, with respect to a virtual circle formed about the connection shaft 51a, the pedal hole 81 may be formed in the shape of a slot parallel to a tangential direction of the corresponding circle. In this case, the pedal hole 81 may be formed to have a larger length in the tangential direction of the corresponding circle than in a normal direction of the corresponding circle. The pedal hole 81 may be formed to pass through the clutch pedal link part 52. The pedal hole 81 may be formed at the other side of the clutch pedal link part 52 to which the pedal link part 6 is connected. In FIG. 11, the pedal hole 81 is illustrated as being formed in the shape of a straight line as a whole. However, the pedal hole 81 is not limited thereto and may also be formed in the shape of a curved line.

The pedal connecting member 82 is coupled to the pedal link part 6. The pedal connecting member 82 and the pedal link part 6 may be coupled so as to move together. The pedal connecting member 82 may be inserted into the pedal hole 81. The pedal connecting member 82 may be inserted into the pedal hole 81 so as to be movable in the pedal hole 81. A washer 82a may be coupled to the pedal connecting member 82. In this case, the clutch pedal link part 52 may be inserted into the pedal hole 81 so that the clutch pedal link part 52 is disposed between the washer 82a and the pedal link part 6. Accordingly, the pedal connecting member 82 may be prevented from being separated from the pedal hole 81 in the process in which the pedal connecting member 82 moves in the pedal hole 81.

The agricultural vehicle 1 including the pedal connecting part 8 according to the first embodiment may operate as follows.

Figure 12:
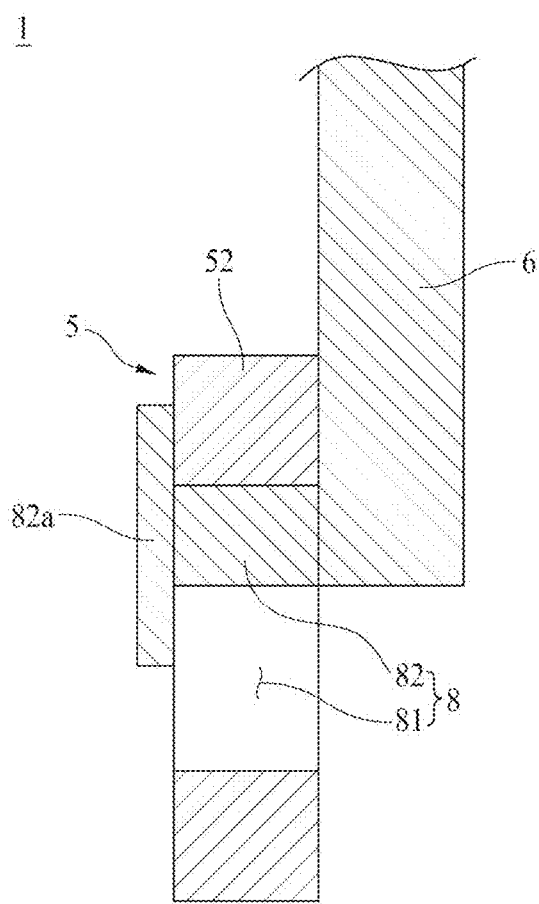
FIGS. 12 to 14 are schematic cross-sectional views for describing an operational relationship of the pedal connecting part according to the first embodiment which are taken along line I-I of FIG. 11.

First, when neither of the clutch pedal 41 and the clutch switch 43 is manipulated, as illustrated in FIGS. 11 and 12, the pedal connecting member 82 may be disposed at the top of the pedal hole 81. Accordingly, a portion of the pedal hole 81 may be disposed below the pedal connecting member 82.

Figure 13:
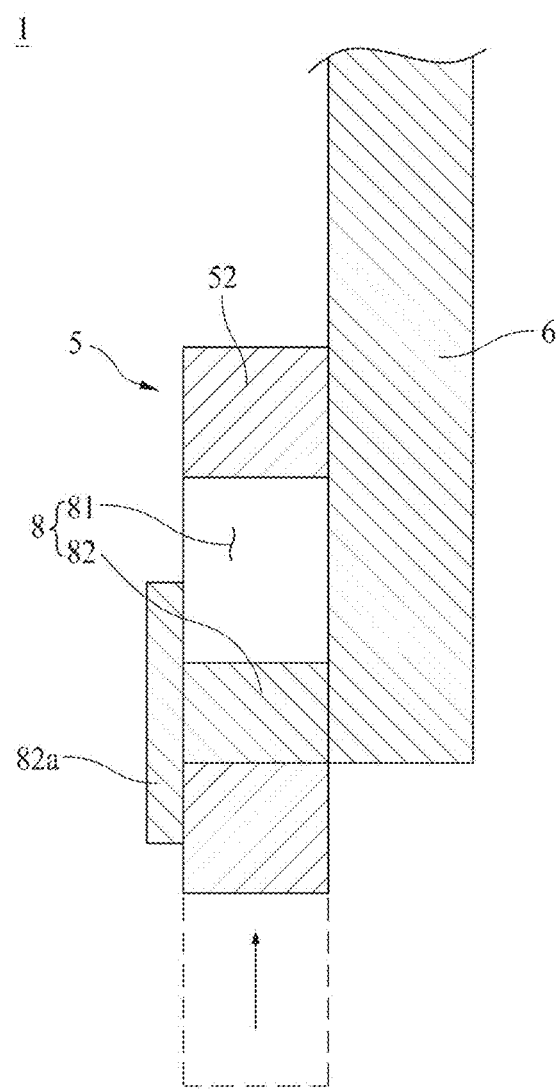

Next, when the clutch switch 43 is manipulated as illustrated in FIG. 8, the clutch switch link part 53 may rotate the clutch link part 51 counterclockwise while rotating counterclockwise due to the pressurization mechanism 71. Accordingly, the clutch 31 may be disengaged. Meanwhile, because, as the clutch link part 51 rotates counterclockwise, the clutch pedal link part 52 rotates counterclockwise and the other side of the clutch pedal link part 52 is lifted, the pedal hole 81 is lifted. In this case, in a state in which a portion of the pedal hole 81 is disposed below the pedal connecting member 82 as illustrated in FIG. 12, the pedal hole 81 is lifted as illustrated in FIG. 13. Accordingly, because only the pedal hole 81 formed at the other side of the clutch pedal link part 52 is lifted without moving the pedal connecting member 82, the clutch pedal link part 52 may rotate independently of the pedal link part 6. Therefore, the pedal connecting part 8 according to the first embodiment may be implemented so as not to move the pedal link part 6 and the clutch pedal 41 even when all of the clutch switch link part 53, the clutch link part 51, and the clutch pedal link part 52 rotate as the clutch switch 43 is manipulated.

Next, when the manipulation on the clutch switch 43 is released after the clutch switch 43 is manipulated, as illustrated in FIG. 9, the clutch link part 51 may interlock with rotation of the clutch link part 51 and rotate clockwise. Accordingly, the clutch 31 may be engaged. Meanwhile, because, as the clutch link part 51 rotates clockwise, the clutch pedal link part 52 rotates and the other side of the clutch pedal link part 52 is lowered, the pedal hole 81 is lowered. In this case, in a state in which a portion of the pedal hole 81 is disposed above the pedal connecting member 82 as illustrated in FIG. 13, the pedal hole 81 is lowered as illustrated in FIG. 12. Accordingly, because the pedal hole 81 formed at the other side of the clutch pedal link part 52 is lowered without moving the pedal connecting member 82, the clutch pedal link part 52 may rotate independently of the pedal link part 6.

Figure 14:
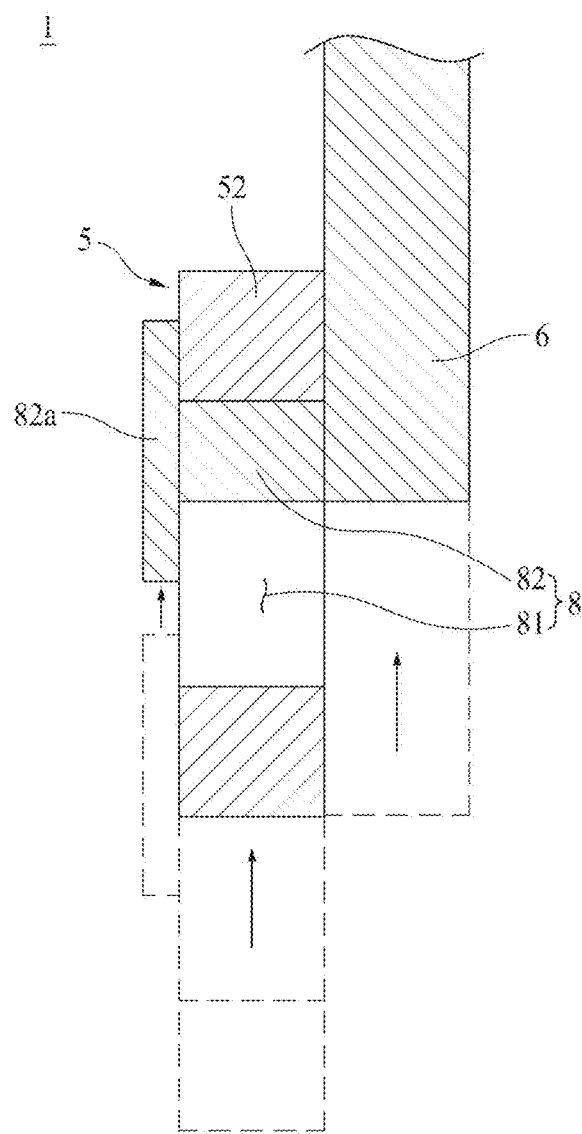

Next, when neither of the clutch pedal 41 and the clutch switch 43 is manipulated, as illustrated in FIGS. 11 and 12, the pedal connecting member 82 may be disposed to come in contact with the clutch pedal link part 52 at the top of the pedal hole 81. In this state, when the clutch pedal 41 is manipulated, the pedal link part 6 may be lifted as illustrated in FIG. 6. In this case, because the pedal connecting member 82 is in contact with the clutch pedal link part 52 at the top of the pedal hole 81 as illustrated in FIG. 14, the pedal connecting member 82 may be lifted as the pedal link part 6 is lifted and may press the other side of the clutch pedal link part 52. Accordingly, as illustrated in FIG. 6, the clutch pedal link part 52 and the clutch link part 51 may rotate counterclockwise as the pedal link part 6 is lifted and disengage the clutch 31. Therefore, the pedal connecting part 8 according to the first embodiment is implemented so that, when the clutch switch 43 is manipulated, the clutch pedal link part 52 may rotate independently of the pedal link part 6 and, when the clutch pedal 41 is manipulated, the clutch pedal link part 52 and the clutch link part 51 may interlock with the pedal link part 6 and rotate.

Next, when the manipulation on the clutch pedal 41 is released after the clutch pedal 41 is manipulated, the pressing force of the pedal connecting member 82 (see FIG. 14) acting on the clutch pedal link part 52 may be released as illustrated in FIG. 7. Accordingly, the clutch 31 may be engaged, and the clutch pedal link part 52 and the clutch link part 51 may rotate clockwise.

Referring to FIGS. 3, 6 to 9, and 15 to 17, the pedal connecting part 8 according to a second embodiment may include the pedal hole 81 and the pedal connecting member 82. The pedal connecting part 8 according to the second embodiment is different from that according to the above-described first embodiment in terms of the arrangement relationship between the pedal hole 81 and the pedal connecting member 82.

The pedal hole 81 may be formed in the pedal link part 6. The pedal hole 81 may be formed in the shape of a slot in the direction in which the clutch pedal link part 52 rotates about the connection shaft 51a. The pedal hole 81 may be formed to pass through the pedal link part 6. The pedal hole 81 may be formed below the pedal link part 6 to which the clutch pedal link part 52 is connected.

The pedal connecting member 82 is coupled to the clutch pedal link part 52. The pedal connecting member 82 and the clutch pedal link part 52 may be coupled so as to rotate together. The pedal connecting member 82 may be inserted into the pedal hole 81 so as to be movable in the pedal hole 81. The washer 82a may be coupled to the pedal connecting member 82. In this case, the pedal connecting member 82 may be inserted into the pedal hole 81 so that the pedal link part 6 is disposed between the washer 82a and the clutch pedal link part 52. Accordingly, the pedal connecting member 82 may be prevented from being separated from the pedal hole 81 in the process in which the pedal connecting member 82 moves in the pedal hole 81.

The agricultural vehicle 1 including the pedal connecting part 8 according to the second embodiment may operate as follows.

Figure 15:
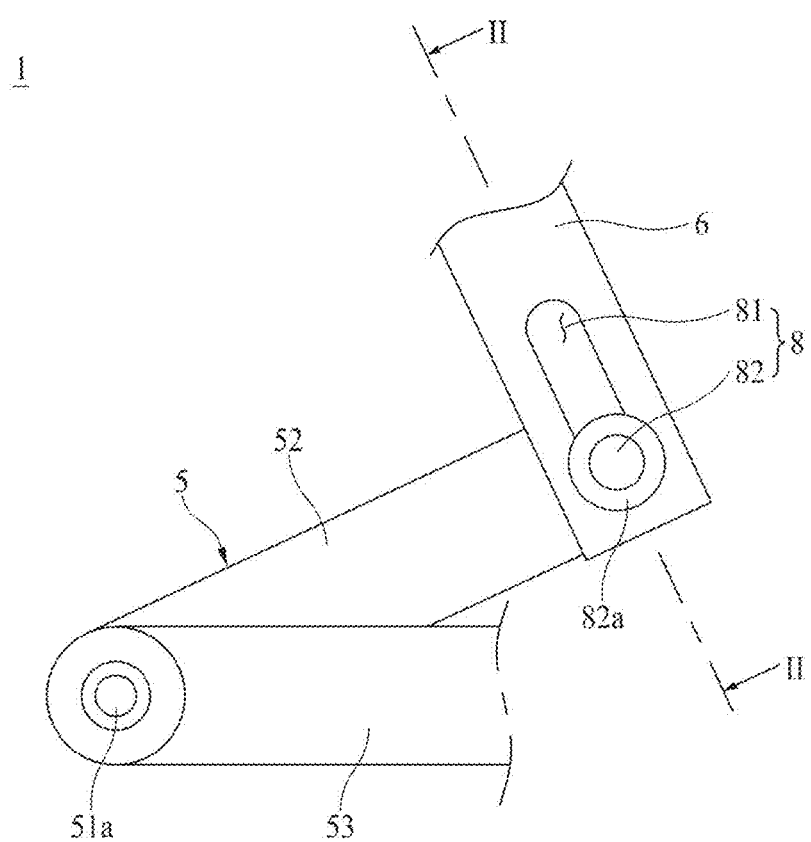
FIG. 15 is a schematic side view for describing a pedal connecting part according to a second embodiment.
Figure 16:
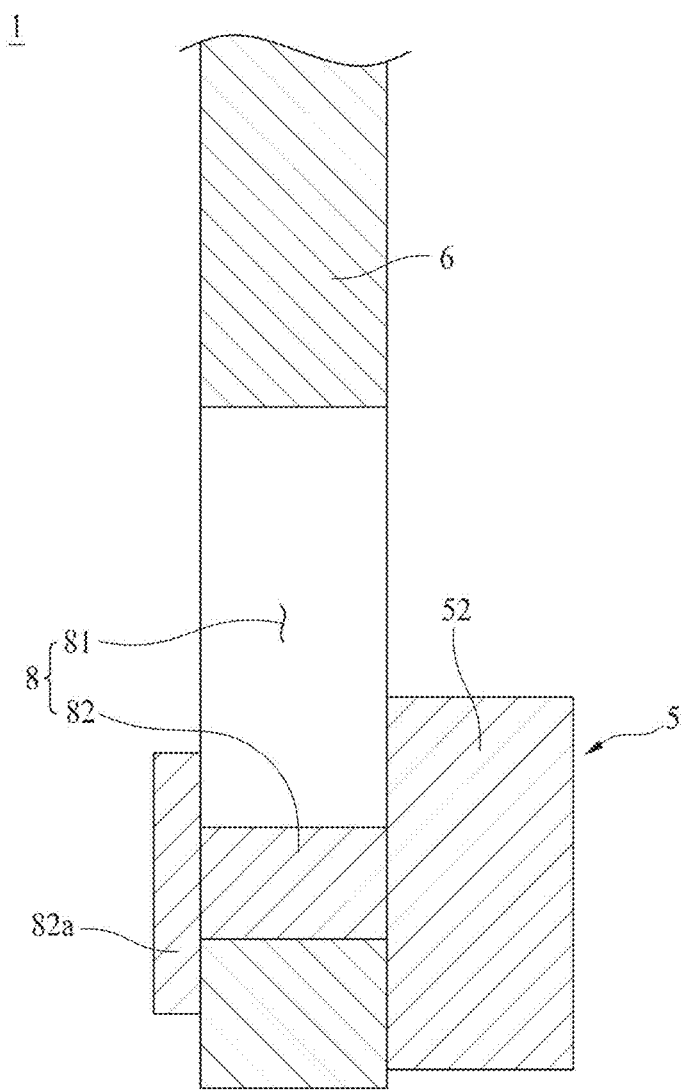
FIGS. 16 and 17 are schematic cross-sectional views for describing an operational relationship of the pedal connecting part according to the second embodiment which are taken along line II-II of FIG. 15.

First, when neither of the clutch pedal 41 and the clutch switch 43 is manipulated, as illustrated in FIGS. 15 and 16, the pedal connecting member 82 may be disposed at the bottom of the pedal hole 81. Accordingly, a portion of the pedal hole 81 may be disposed above the pedal connecting member 82.

Figure 17:
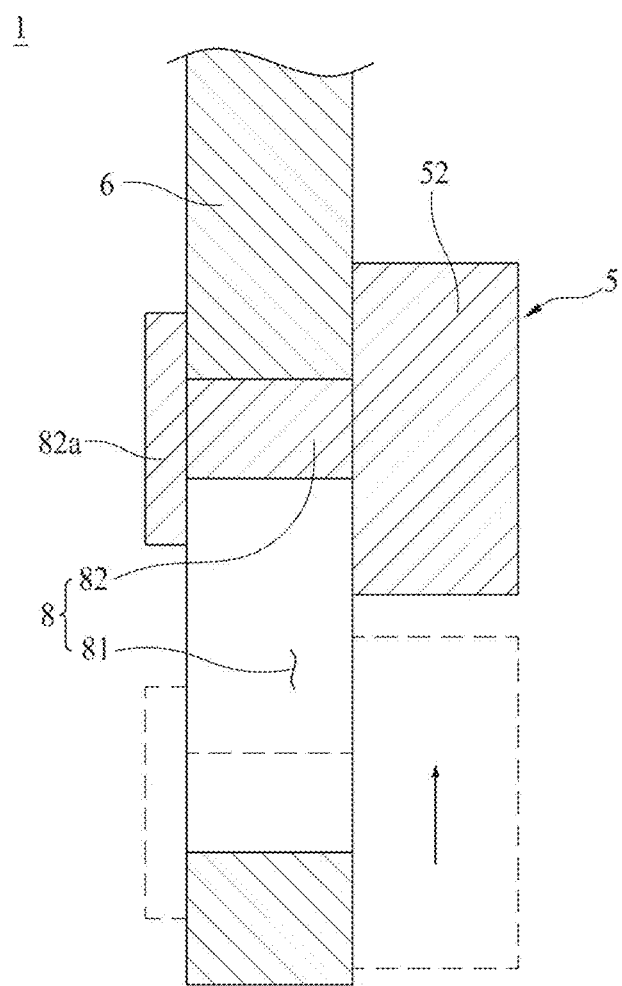

Next, when the clutch 31 is disengaged as the clutch switch 43 is manipulated the clutch pedal link part 52 may interlock with rotation of the clutch link part 51 and rotate counterclockwise. Accordingly, because the other side of the clutch pedal link part 52 is lifted, the pedal connecting member 82 is lifted in the pedal hole 81. In this case, in a state in which a portion of the pedal hole 81 is disposed above the pedal connecting member 82 as illustrated in FIG. 16, the pedal connecting member 82 is lifted as illustrated in FIG. 17. Therefore, the clutch pedal link part 52 may rotate independently of the pedal link part 6.

Next, when the clutch 31 is engaged as the manipulation on the clutch switch 43 is released after the clutch switch 43 is manipulated, the clutch pedal link part 52 may interlock with rotation of the clutch link part 51 and rotate clockwise. Accordingly, because the other side of the clutch pedal link part 52 is lowered, the pedal connecting member 82 is lowered. In this case, in a state in which a portion of the pedal hole 81 is disposed below the pedal connecting member 82 as illustrated in FIG. 17, the pedal connecting member 82 is lowered in the pedal hole 81 as illustrated in FIG. 16. Therefore, the clutch pedal link part 52 may rotate independently of the pedal link part 6.

Next, when neither of the clutch pedal 41 and the clutch switch 43 is manipulated, as illustrated in FIGS. 15 and 16, the pedal connecting member 82 may be disposed to come in contact with the pedal link part 6 at the bottom of the pedal hole 81. In this state, when the clutch pedal 41 is manipulated, the pedal connecting member 82 may be pushed by the pedal link part 6 and lifted as the pedal link part 6 is lifted. Accordingly, as illustrated in FIG. 6, as the pedal link part 6 is lifted, the clutch pedal link part 52 and the clutch link part 51 may rotate counterclockwise and disengage the clutch 31. Then, when the manipulation on the clutch pedal 41 is released, the pressing force of the pedal link part 6 acting on the pedal connecting member 82 (see FIG. 19) may be released as illustrated in FIG. 7. Accordingly, the clutch 31 may be engaged, and the clutch pedal link part 52 and the clutch link part 51 may rotate clockwise.

The pedal connecting part 8 according to the second embodiment is implemented so that, when the clutch switch 43 is manipulated, the clutch pedal link part 52 may rotate independently of the pedal link part 6 and, when the clutch pedal 41 is manipulated, the clutch pedal link part 52 and the clutch link part 51 may interlock with the pedal link part 6 and rotate.

Figure 18:
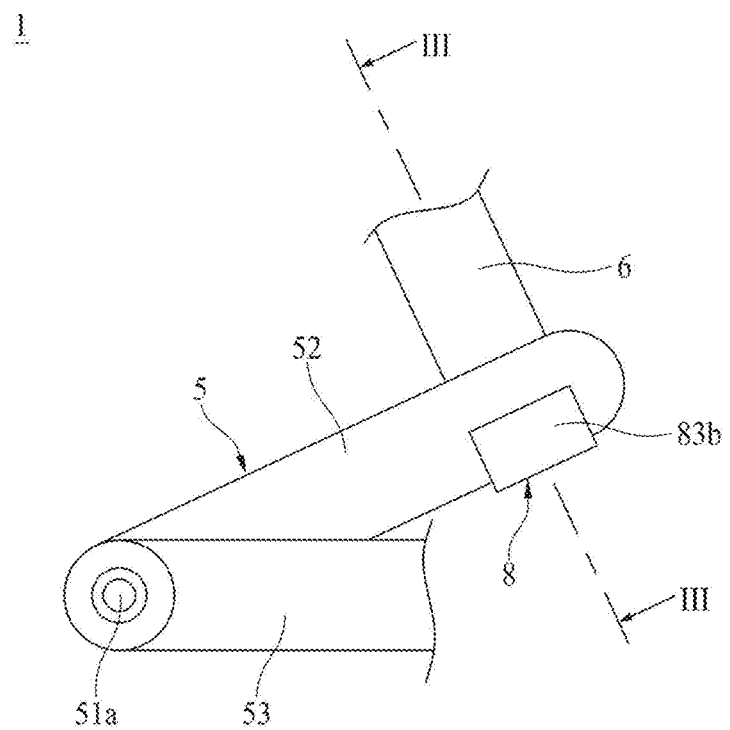
FIG. 18 is a schematic side view for describing a pedal connecting part according to a third embodiment.
Figure 19:
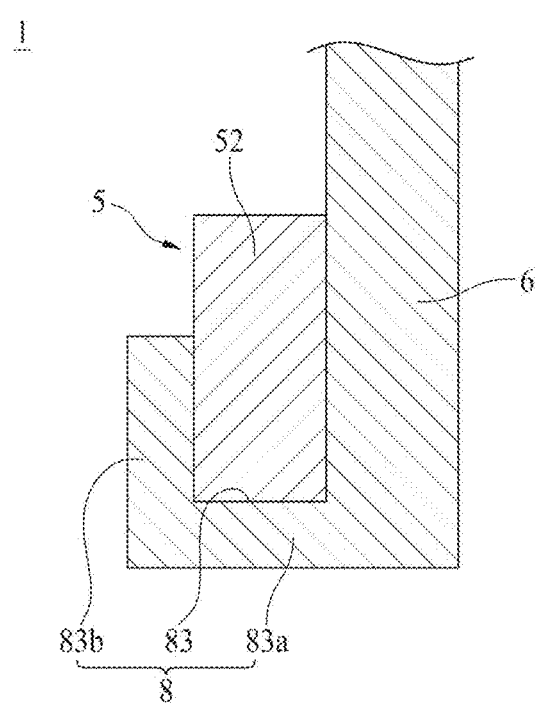
FIGS. 19 and 20 are schematic cross-sectional views for describing an operational relationship of the pedal connecting part according to the third embodiment which are taken along line of FIG. 18.
Figure 20:
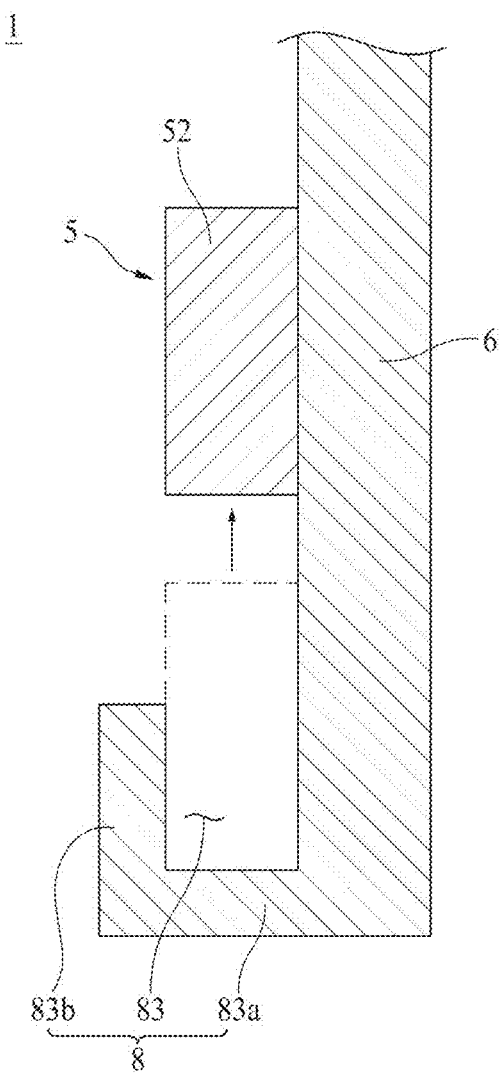

Referring to FIGS. 3, 6 to 9, and 18 to 20, the pedal connecting part 8 according to a third embodiment may include a pedal groove 83 (see FIG. 20).

The pedal groove 83 is formed in the pedal link part 6. The pedal groove 83 may be formed so that the clutch pedal link part 52 may be inserted thereinto. The other side of the clutch pedal link part 52 may be inserted into the pedal groove 83. A stand member 83a disposed below the pedal groove 83 and a limiting member 83b coupled to the stand member 83a may be coupled to the pedal link part 6. When the clutch pedal link part 52 is inserted into the pedal groove 83, the clutch pedal link part 52 may be supported by the stand member 83a. In this case, the clutch pedal link part 52 may be disposed between the limiting member 83b and the pedal link part 6.

The agricultural vehicle 1 including the pedal connecting part 8 according to the third embodiment may operate as follows.

First, when neither of the clutch pedal 41 and the clutch switch 43 is manipulated, as illustrated in FIGS. 18 and 19, the clutch pedal link part 52 may be inserted into the pedal groove 83 (see FIG. 20).

Next, when the clutch 31 is disengaged as the clutch switch 43 is manipulated, the clutch pedal link part 52 may interlock with rotation of the clutch link part 51 and rotate counterclockwise. Accordingly, as illustrated in FIG. 20, the other side of the clutch pedal link part 52 is lifted and detached from the pedal groove 83. Therefore, the clutch pedal link part 52 may rotate independently of the pedal link part 6.

Next, when the clutch 31 is engaged as the manipulation on the clutch switch 43 is released after the clutch switch 43 is manipulated, the clutch pedal link part 52 may interlock with rotation of the clutch link part 51 and rotate clockwise. Accordingly, the other side of the clutch pedal link part 52 is inserted into the pedal groove 83. Therefore, the clutch pedal link part 52 may rotate independently of the pedal link part 6.

Next, when neither of the clutch pedal 41 and the clutch switch 43 is manipulated, as illustrated in FIGS. 18 and 19, the clutch pedal link part 52 may be inserted into the pedal groove 83 and come in contact with the stand member 83a. In this state, when the clutch pedal 41 is manipulated, the clutch pedal link part 52 may be pushed by the pedal link part 6 and lifted as the pedal link part 6 is lifted. Accordingly, as illustrated in FIG. 6, as the pedal link part 6 is lifted, the clutch pedal link part 52 and the clutch link part 51 may rotate counterclockwise and disengage the clutch 31. Then, when the manipulation on the clutch pedal 41 is released, the pressing force of the pedal link part 6 acting on the clutch pedal link part 52 may be released as illustrated in FIG. 7. Accordingly, the clutch 31 may be engaged, and the clutch pedal link part 52 and the clutch link part 51 may rotate clockwise.

The pedal connecting part 8 according to the third embodiment is implemented so that, when the clutch switch 43 is manipulated, the clutch pedal link part 52 may rotate independently of the pedal link part 6 and, when the clutch pedal 41 is manipulated, the clutch pedal link part 52 and the clutch link part 51 may interlock with the pedal link part 6 and rotate.

Referring to FIGS. 3, 6 to 9, and 21 to 30, the agricultural vehicle 1 according to the present disclosure may include a switch connecting part 9.

The switch connecting part 9 connects the clutch switch link part 53 and the operation part 7 so that the clutch switch link part 53 and the operation part 7 interlock selectively according to which of the clutch pedal 41 and the clutch switch 43 is manipulated. When the clutch switch 43 is manipulated, the switch connecting part 9 may connect the clutch switch link part 53 and the operation part 7 so that the clutch switch link part 53 interlocks with the operation part 7 and rotates. When the clutch pedal 41 is manipulated, the switch connecting part 9 may connect the clutch switch link part 53 and the operation part 7 so that the clutch switch link part 53 rotates independently of the operation part 7. Accordingly, the agricultural vehicle 1 according to the present disclosure is implemented so that, when the driver manipulates the clutch pedal 41 by stepping thereon with his or her foot, the clutch switch link part 53 is able to rotate smoothly without being obstructed by the operation part 7. Therefore, the agricultural vehicle 1 according to the present disclosure is implemented to provide the driver with convenience in the shifting manipulation using the clutch switch 43 and also allow the clutch 31 to be smoothly controlled through manipulation of the clutch pedal 41.

Here, the agricultural vehicle 1 according to the present disclosure may include the switch connecting part 9 according to various embodiments. Hereinafter, the switch connecting part 9 according to various embodiments will be described in detail with reference to the accompanying drawings.

Figure 21:
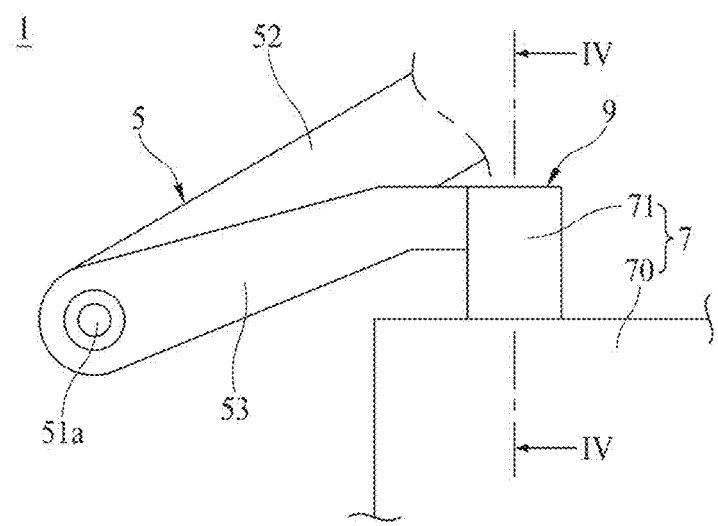
FIG. 21 is a schematic side view for describing a switch connecting part according to a first embodiment.
Figure 22:
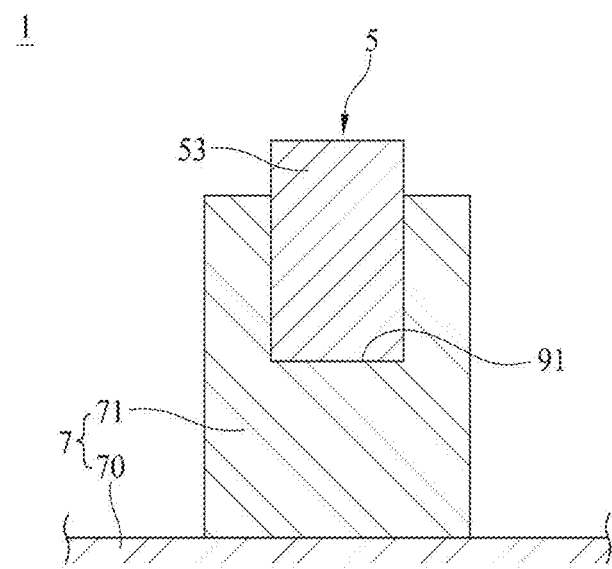
FIGS. 22 to 24 are schematic cross-sectional views for describing an operational relationship of the switch connecting part according to the first embodiment which are taken along line IV-IV of FIG. 21.
Figure 23:
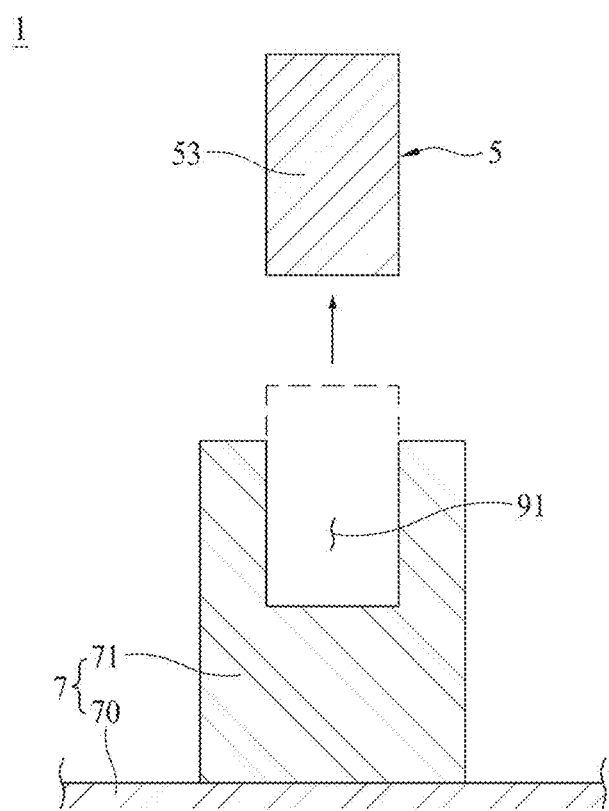
Figure 24:
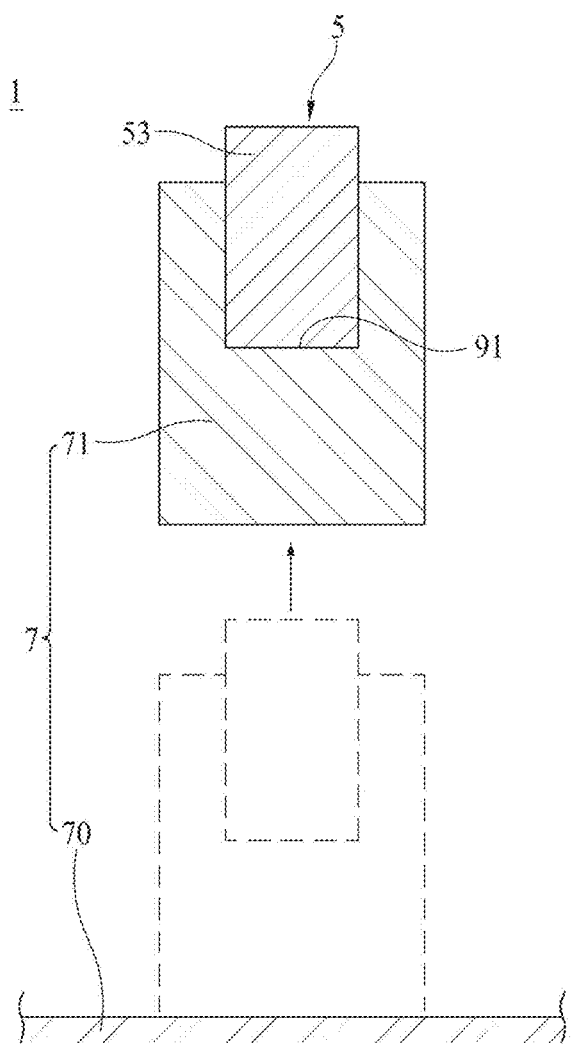

Referring to FIGS. 3, 6 to 9, and 21 to 24, the switch connecting part 9 according to a first embodiment may include a switch groove 91 (see FIG. 23).

The switch groove 91 is formed in the pressurization mechanism 71. The switch groove 91 may be formed so that the clutch switch link part 53 may be inserted thereinto. The other side of the clutch switch link part 53 may be inserted into the switch groove 91. One side of the clutch switch link part 53 may be connected to the clutch link part 51. When the clutch switch link part 53 is inserted into the switch groove 91, the clutch switch link part 53 may be supported by the pressurization mechanism 71.

The agricultural vehicle 1 including the switch connecting part 9 according to the first embodiment may operate as follows.

First, when neither of the clutch pedal 41 and the clutch switch 43 is manipulated, as illustrated in FIGS. 21 and 22, the clutch switch link part 53 may be inserted into the switch groove 91. In this case, the clutch switch link part 53 may be disposed to come in contact with the pressurization mechanism 71.

Next, when the clutch 31 is disengaged as the clutch pedal 41 is manipulated, the clutch switch link part 53 may interlock with rotation of the clutch link part 51 and rotate counterclockwise. Accordingly, as illustrated in FIG. 23, the other side of the clutch switch link part 53 is lifted and detached from the switch groove 91. Therefore, the clutch switch link part 53 may rotate independently of the pressurization mechanism 71. Accordingly, the switch connecting part 9 according to the first embodiment may be implemented so as not to move the pressurization mechanism 71 even when all of the clutch pedal link part 52, the clutch link part 51, and the clutch switch link part 53 rotate as the clutch pedal 41 is manipulated. Therefore, the switch connecting part 9 according to the first embodiment may be implemented so that the clutch 31 is smoothly controlled through the clutch pedal 41.

Next, when the clutch 31 is engaged as the manipulation on the clutch pedal 41 is released after the clutch pedal 41 is manipulated, the clutch switch link part 53 may interlock with rotation of the clutch link part 51 and rotate clockwise. Accordingly, the other side of the clutch switch link part 53 is inserted into the switch groove 91. Therefore, the clutch switch link part 53 may rotate independently of the pressurization mechanism 71.

Next, when neither of the clutch pedal 41 and the clutch switch 43 is manipulated, as illustrated in FIGS. 21 and 22, the clutch switch link part 53 may be inserted into the switch groove 91 and disposed to come in contact with the pressurization mechanism 71. In this case, a lower surface of the clutch switch link part 53 may be supported by the pressurization mechanism 71. In this state, when the clutch switch 43 is manipulated, the clutch switch link part 53 may be pushed by the pressurization mechanism 71 and lifted as the pressurization mechanism 71 is lifted. Accordingly, as illustrated in FIG. 8, as the pressurization mechanism 71 is lifted, the clutch switch link part 53 may rotate counterclockwise and rotate the clutch link part 51 counterclockwise. Therefore, the clutch 31 may be disengaged. Accordingly, the switch connecting part 9 according to the first embodiment is implemented so that, when the clutch pedal 41 is manipulated, the clutch switch link part 53 may rotate independently of the pressurization mechanism 71 and, when the clutch switch 43 is manipulated, the clutch switch link part 53 may interlock with the pressurization mechanism 71 and rotate.

Next, when the manipulation on the clutch switch 43 is released after the clutch switch 43 is manipulated, the pressing force acting on the clutch switch link part 53 may be removed as the pressurization mechanism 71 is lowered as illustrated in FIG. 9. Accordingly, the clutch 31 may be engaged, and the clutch switch link part 53 and the clutch link part 51 may rotate clockwise.

Referring to FIGS. 3, 6 to 9, and 25 to 27, the switch connecting part 9 according to a second embodiment may include a switch hole 92 and a switch connecting member 93.

Figure 25:
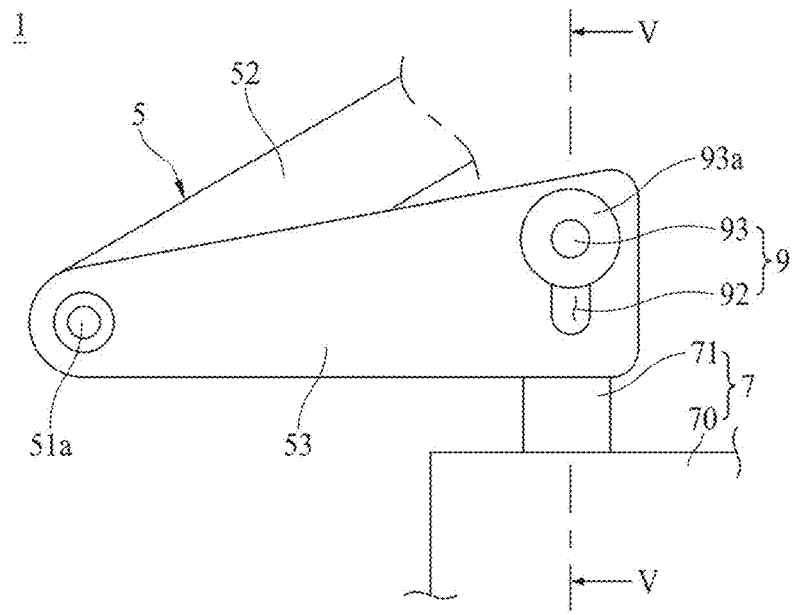
FIG. 25 is a schematic side view for describing a switch connecting part according to a second embodiment.

The switch hole 92 is formed in the clutch switch link part 53. The switch hole 92 may be formed in the shape of a slot in a direction in which the clutch switch link part 53 rotates about the connection shaft 51a. The switch hole 92 may be formed to pass through the clutch switch link part 53. The switch hole 92 may be formed at the other side of the clutch switch link part 53 to which the pressurization mechanism 71 is connected. In FIG. 25, the switch hole 92 is illustrated as being formed in the shape of a straight line as a whole. However, the switch hole 92 is not limited thereto and may also be formed in the shape of a curved line.

The switch connecting member 93 is coupled to the pressurization mechanism 71. The switch connecting member 93 and the pressurization mechanism 71 may be coupled so as to move together. The switch connecting member 93 may be inserted into the switch hole 92 so as to be movable in the switch hole 92. A washer 93a may be coupled to the switch connecting member 93. In this case, the switch connecting member 93 may be inserted into the switch hole 92 so that the clutch switch link part 53 is disposed between the washer 93a and the pressurization mechanism 71. Accordingly, the switch connecting member 93 may be prevented from being separated from the switch hole 92 in the process in which the switch connecting member 93 moves in the switch hole 92.

The agricultural vehicle 1 including the switch connecting part 9 according to the second embodiment may operate as follows.

Figure 26:
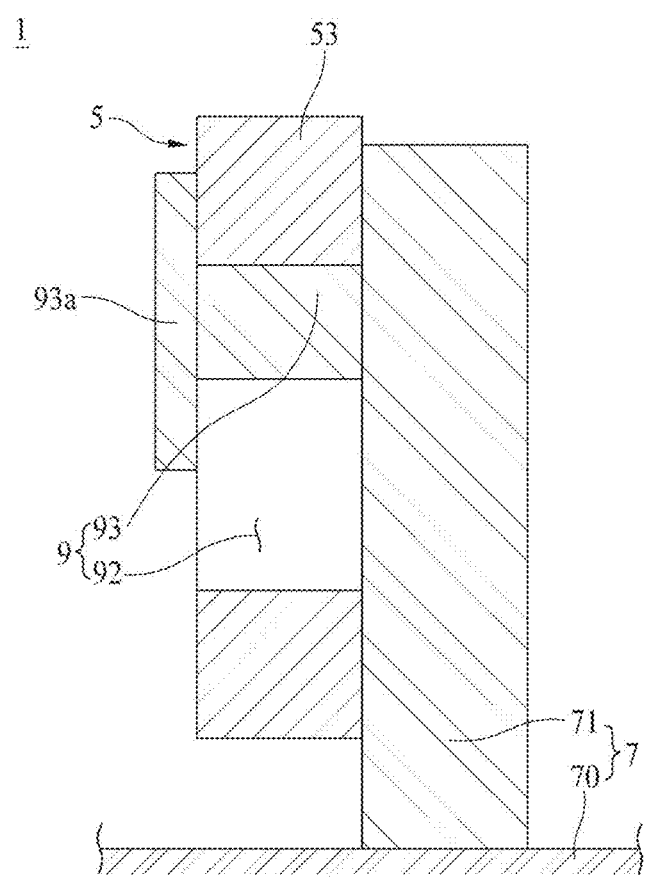
FIGS. 26 and 27 are schematic cross-sectional views for describing an operational relationship of the switch connecting part according to the second embodiment which are taken along line V-V of FIG. 25.

First, when neither of the clutch pedal 41 and the clutch switch 43 is manipulated, as illustrated in FIGS. 25 and 26, the switch connecting member 93 may be disposed at the top of the switch hole 92. Accordingly, a portion of the switch hole 92 may be disposed below the switch connecting member 93.

Figure 27:
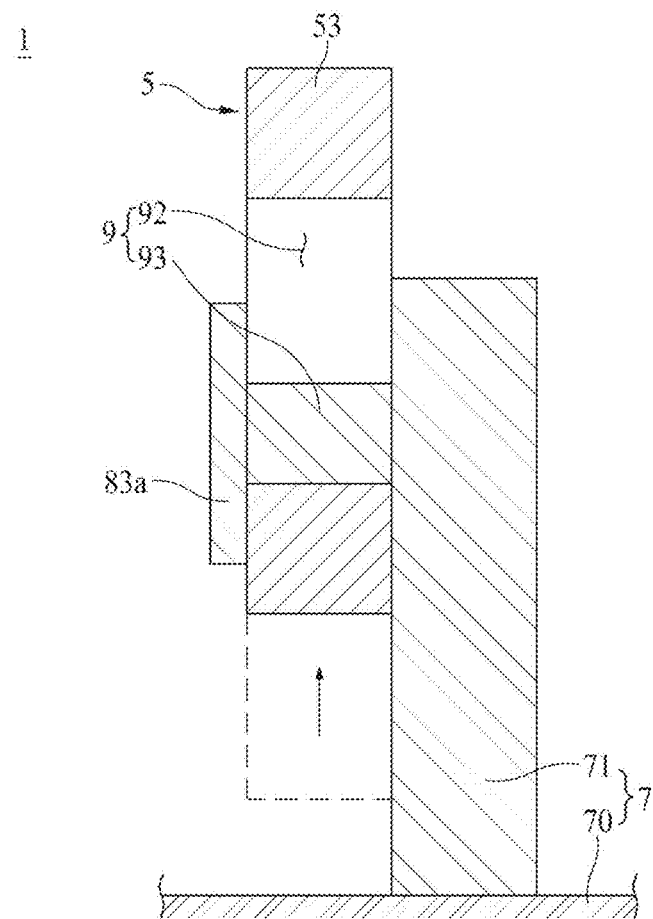

Next, when the clutch 31 is disengaged as the clutch pedal 41 is manipulated, the clutch switch link part 53 may interlock with the clutch link part 51 and rotate counterclockwise. Accordingly, because the other side of the clutch switch link part 53 is lifted, the switch hole 92 is lifted. In this case, in a state in which a portion of the switch hole 92 is disposed below the switch connecting member 93 as illustrated in FIG. 26, the switch hole 92 is lifted as illustrated in FIG. 27. Therefore, the clutch switch link part 53 may rotate independently of the pressurization mechanism 71.

Next, when the clutch 31 is engaged as the manipulation on the clutch pedal 41 is released after the clutch pedal 41 is manipulated, the clutch switch link part 53 may interlock with rotation of the clutch link part 51 and rotate clockwise. Accordingly, because the other side of the clutch switch link part 53 is lowered, the switch hole 92 is lowered. Therefore, the clutch switch link part 53 may rotate independently of the pressurization mechanism 71.

Next, when neither of the clutch pedal 41 and the clutch switch 43 is manipulated, as illustrated in FIGS. 25 and 26, the switch connecting member 93 may be disposed to come in contact with the clutch switch link part 53 at the top of the switch hole 92. In this state, when the clutch switch 43 is manipulated, the switch connecting member 93 may be lifted as the pressurization mechanism 71 is lifted and press the other side of the clutch switch link part 53. Accordingly, as illustrated in FIG. 8, as the pressurization mechanism 71 is lifted, the clutch switch link part 53 and the clutch link part 51 may rotate counterclockwise and disengage the clutch 31. Then, when the manipulation on the clutch switch 43 is released, the pressing force of the switch connecting member 93 (see FIG. 30) acting on the clutch switch link part 53 may be released as the pressurization mechanism 71 is lowered as illustrated in FIG. 9. Accordingly, the clutch 31 may be engaged, and the clutch switch link part 53 and the clutch link part 51 may rotate clockwise.

Referring to FIGS. 3, 6 to 9, and 28 to 30, the switch connecting part 9 according to a third embodiment may include the switch hole 92 and the switch connecting member 93. The switch connecting part 9 according to the third embodiment is different from that according to the above-described second embodiment in terms of the arrangement relationship between the switch hole 92 and the switch connecting member 93.

The switch hole 92 may be formed in the pressurization mechanism 71. The switch hole 92 may be formed in the shape of a slot in the direction in which the clutch switch link part 53 rotates about the connection shaft 51a. The switch hole 92 may be formed to pass through the pressurization mechanism 71.

The switch connecting member 93 is coupled to the clutch switch link part 53. The switch connecting member 93 and the clutch switch link part 53 may be coupled so as to rotate together. The switch connecting member 93 may be inserted into the switch hole 92 so as to be movable in the switch hole 92. The washer 93a may be coupled to the switch connecting member 93. In this case, the switch connecting member 93 may be inserted into the switch hole 92 so that the pressurization mechanism 71 is disposed between the washer 93a and the clutch switch link part 53. Accordingly, the switch connecting member 93 may be prevented from being separated from the switch hole 92 in the process in which the switch connecting member 93 moves in the switch hole 92.

The agricultural vehicle 1 including the switch connecting part 9 according to the third embodiment may operate as follows.

Figure 28:
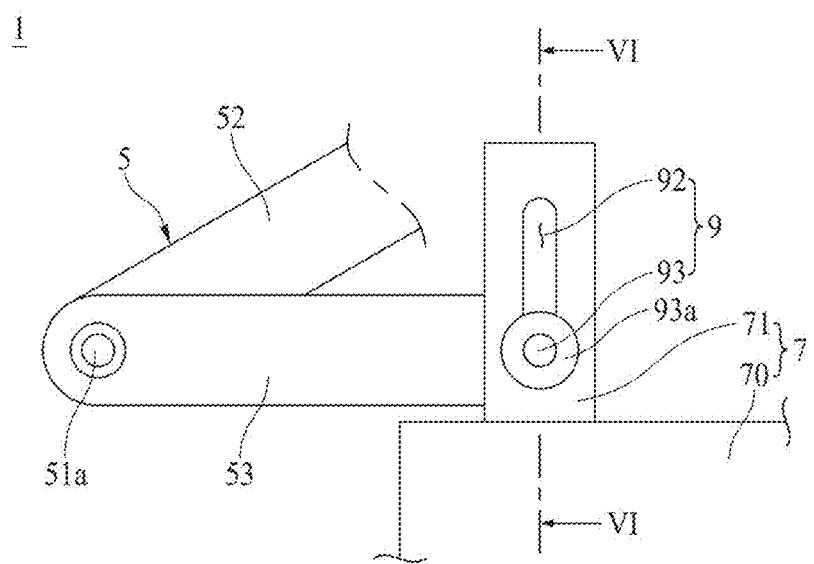
FIG. 28 is a schematic side view for describing a switch connecting part according to a third embodiment.
Figure 29:
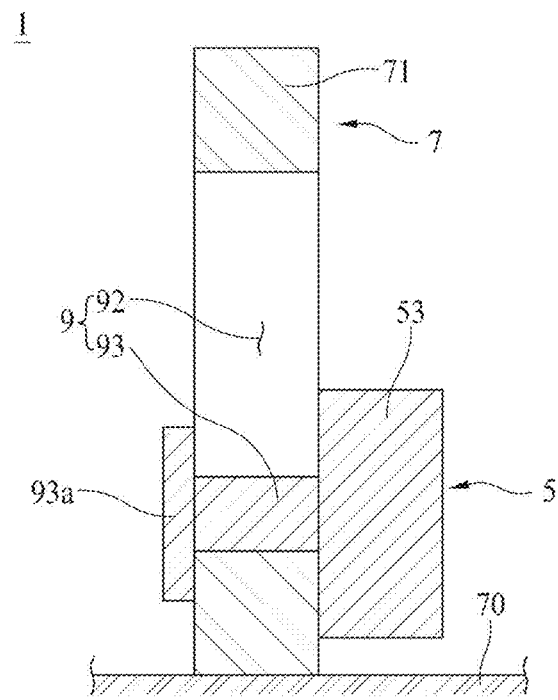
FIGS. 29 and 30 are schematic cross-sectional views for describing an operational relationship of the switch connecting part according to the third embodiment which are taken along line VI-VI of FIG. 28.
Figure 30:
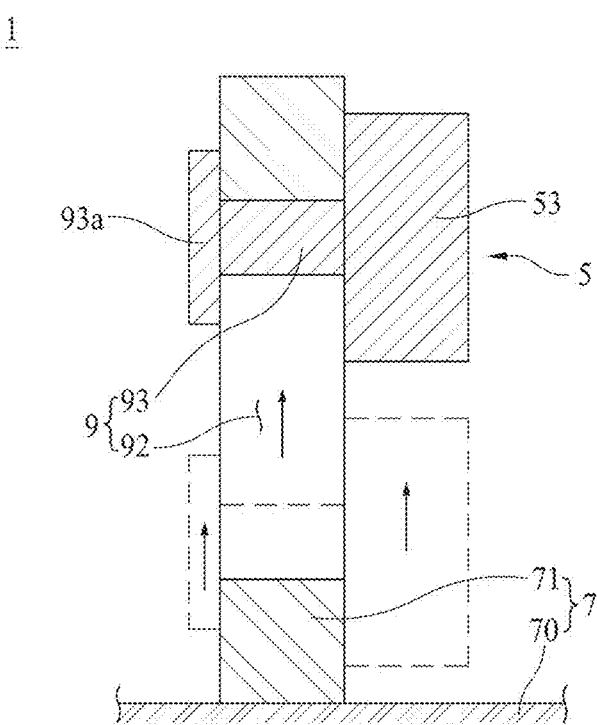

First, when neither of the clutch pedal 41 and the clutch switch 43 is manipulated, as illustrated in FIGS. 28 and 29, the switch connecting member 93 may be disposed at the bottom of the switch hole 92. Accordingly, a portion of the switch hole 92 may be disposed above the switch connecting member 93.

Next, when the clutch 31 is disengaged as the clutch pedal 41 is manipulated, the clutch switch link part 53 may interlock with rotation of the clutch link part 51 and rotate counterclockwise. Accordingly, because the other side of the clutch switch link part 53 is lifted, the switch connecting member 93 is lifted in the switch hole 92. Therefore, the clutch switch link part 53 may rotate independently of the pressurization mechanism 71.

Next, when the clutch 31 is engaged as the manipulation on the clutch pedal 41 is released after the clutch pedal 41 is manipulated, the clutch switch link part 53 may interlock with rotation of the clutch link part 51 and rotate clockwise. Accordingly, because the other side of the clutch switch link part 53 is lowered, the switch connecting member 93 is lowered. Therefore, the clutch switch link part 53 may rotate independently of the pressurization mechanism 71.

Next, when neither of the clutch pedal 41 and the clutch switch 43 is manipulated, as illustrated in FIGS. 28 and 29, the switch connecting member 93 may be disposed to come in contact with the pressurization mechanism 71 at the bottom of the switch hole 92. In this state, when the clutch switch 43 is manipulated, the switch connecting member 93 may be pushed by the pressurization mechanism 71 and lifted as the pressurization mechanism 71 is lifted. Accordingly, as illustrated in FIG. 8, as the pressurization mechanism 71 is lifted, the clutch switch link part 53 and the clutch link part 51 may rotate counterclockwise and disengage the clutch 31. Then, when the manipulation on the clutch switch 43 is released after the clutch switch 43 is manipulated, the pressing force acting on the switch connecting member 93 (see FIG. 30) may be removed as the pressurization mechanism 71 is lowered as illustrated in FIG. 9. Accordingly, the clutch 31 may be engaged, and the clutch switch link part 53 and the clutch link part 51 may rotate clockwise.

In the agricultural vehicle 1 according to the present disclosure, a modified embodiment of the operation part 7 is as follows.

Figure 31:
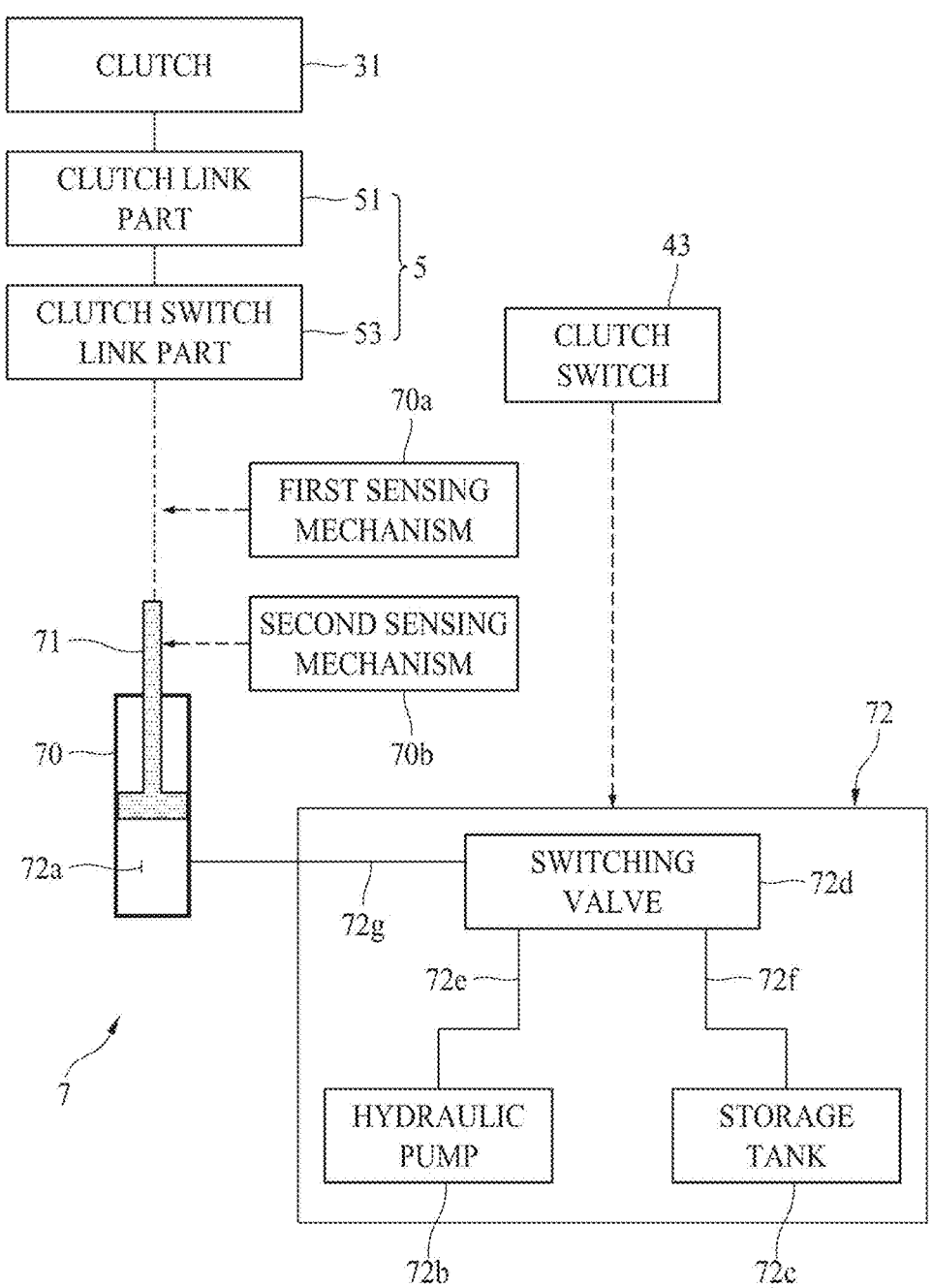
FIG. 31 is a schematic block diagram of an embodiment in which the supply and discharge of a working fluid to and from a hydraulic chamber is controlled using a switching valve.

Referring to FIG. 31, the operation main body 70 may include a lifting groove (not illustrated) to which the pressurization mechanism 71 is coupled so as to be able to be lifted and lowered and an installation groove (not illustrated) to which the hydraulic mechanism 72 is coupled. The lifting groove may be entirely or partially used as a hydraulic chamber 72a for a working fluid that the hydraulic mechanism 72 supplies. In this case, the operation main body 70 may include a communication hole (not illustrated) which connects the hydraulic chamber 72a and the hydraulic mechanism 72 so as to be able to communicate with each other. The hydraulic mechanism 72 may lift or lower the pressurization mechanism 71 by supplying or discharging the working fluid to or from the hydraulic chamber 72a through the communication hole. Accordingly, the agricultural vehicle 1 according to the present disclosure is implemented to be able to modularize the pressurization mechanism 71 and the hydraulic mechanism 72 using the operation main body 70 and allow the hydraulic mechanism 72 to lift or lower the pressurization mechanism 71 by a hydraulic pressure using the communication hole without external piping.

Referring to FIG. 31, the hydraulic mechanism 72 may lift or lower the pressurization mechanism 71 by supplying or discharging the working fluid to or from the hydraulic chamber 72a according to whether the clutch switch 43 is manipulated. When the clutch switch 43 is manipulated, the hydraulic mechanism 72 may supply the working fluid to the hydraulic chamber 72a. Accordingly, the pressurization mechanism 71 may be lifted and rotate the clutch switch link part 53 and the clutch link part 51, thereby disengaging the clutch 31. When the manipulation on the clutch switch 43 is released after the clutch switch 43 is manipulated, the hydraulic mechanism 72 may discharge the working fluid from the hydraulic chamber 72a. Accordingly, the pressurization mechanism 71 may be lowered and release the force rotating the clutch switch link part 53 and the clutch link part 51, thereby engaging the clutch 31. Although not illustrated, the clutch 31 may be engaged as the pressurization mechanism 71 is lifted, and the clutch 31 may be disengaged as the pressurization mechanism 71 is lowered. In this case, the pressurization mechanism 71 may also be disposed above the clutch switch link part 53. Hereinafter, description will be given on the basis of an embodiment in which the clutch 31 is disengaged as the pressurization mechanism 71 is lifted and the clutch 31 is engaged as the pressurization mechanism 71 is lowered.

The hydraulic mechanism 72 may include a hydraulic pump 72b, a storage tank 72c, and a switching valve 72d.

The hydraulic pump 72b supplies a working fluid. The hydraulic pump 72b may be connected to the switching valve 72d through a supply line 72e.

The storage tank 72c stores the working fluid discharged from the hydraulic chamber 72a. The storage tank 72c may be connected to the switching valve 72d through a discharge line 72f.

The switching valve 72d selectively allows the working fluid to pass therethrough. The switching valve 72d may be connected to the hydraulic chamber 72a through a hydraulic line 72g.

When the clutch switch 43 is not manipulated, the switching valve 72d may block passage of the working fluid. In this case, the switching valve 72d perform blocking so that the supply line 72e, the discharge line 72f, and the hydraulic line 72g are not connected to each other.

When the clutch switch 43 is manipulated, the switching valve 72d may allow the working fluid to pass therethrough so that the working fluid supplied from the hydraulic pump 72b is supplied to the hydraulic chamber 72a. Accordingly, as the pressurization mechanism 71 is lifted, the clutch 31 may be disengaged. In this case, the switching valve 72d may connect the hydraulic line 72g and the supply line 72e.

When the manipulation on the clutch switch 43 is released after the clutch switch 43 is manipulated, the switching valve 72d may allow the working fluid to pass therethrough so that the working fluid discharged from the hydraulic chamber 72a is discharged to the storage tank 72c. Accordingly, as the pressurization mechanism 71 is lowered, the clutch 31 may be engaged. In this case, the switching valve 72d may connect the hydraulic line 72g and the discharge line 72f.

In this way, the hydraulic mechanism 72 is implemented to provide a hydraulic pressure when the clutch 31 is being disengaged and to remove the hydraulic pressure when the clutch 31 is being engaged. That is, the hydraulic mechanism 72 may be implemented to engage the clutch 31 using a pressure release timing control method. Here, the agricultural vehicle 1 according to the present disclosure may be implemented so that an engagement speed at which the clutch 31 is engaged is lower than a disengagement speed at which the clutch 31 is disengaged. Therefore, the agricultural vehicle 1 according to the present disclosure may reduce impact, shaking, and the like that occurs in the process of engaging the clutch 31.

Meanwhile, when the pressurization mechanism 71 and the hydraulic mechanism 72 are modularized using the operation main body 70, the hydraulic mechanism 72 may be disposed inside the operation main body 70. The pressurization mechanism 71 may be coupled to the operation main body 70 so as to be able to be lifted and lowered. The lifting groove of the operation main body 70, to which the pressurization mechanism 71 is coupled so as to be able to be lifted and lowered, may be used as the hydraulic chamber 72a. In this case, the hydraulic line 72g may be implemented as the communication hole (not illustrated). The hydraulic pump 72b and the storage tank 72c may also be disposed inside the operation main body 70. In this case, each of the supply line 72e and the discharge line 72f may be implemented as a groove or hole formed inside the operation main body 70. The switching valve 72d of the hydraulic mechanism 72 may also be disposed inside the operation main body 70 and modularized with the pressurization mechanism 71. In this case, among the elements of the hydraulic mechanism 72, the hydraulic pump 72b and the storage tank 72c may be installed outside the operation main body 70. In this case, the supply line 72e may connect the hydraulic pump 72b outside the operation main body 70 and the switching valve 72d inside the operation main body 70. The discharge line 72f may connect the storage tank 72c outside the operation main body 70 and the switching valve 72d inside the operation main body 70. Each of the supply line 72e and the discharge line 72f may also have a portion thereof implemented as a groove or hole formed inside the operation main body 70.

Figure 32:
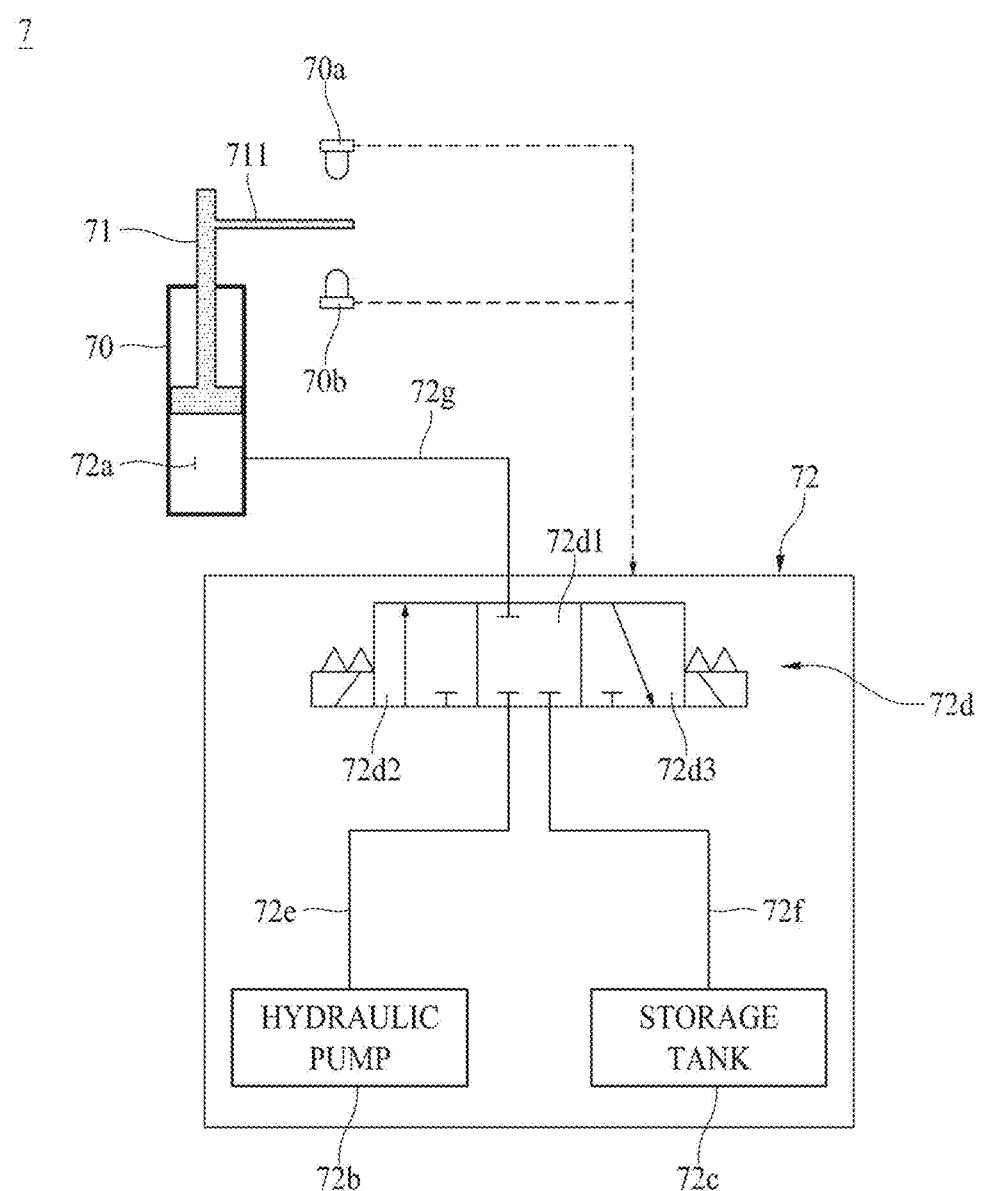
FIG. 32 is a schematic hydraulic pressure circuit diagram of the embodiment in which the supply and discharge of the working fluid to and from the hydraulic chamber is controlled using the switching valve.

Referring to FIGS. 31 and 32, the operation part 7 may include a first sensing mechanism 70a.

The first sensing mechanism 70a senses whether the pressurization mechanism 71 has reached a first limiting position. When the pressurization mechanism 71 keeps moving in the same direction even after reaching the first limiting position, there is a risk that deformation may occur in the pressurization mechanism 71, the clutch switch link part 53, the clutch link part 51, the clutch 31, and the like. In order to prevent this, when the first sensing mechanism 70a senses that the pressurization mechanism 71 has reached the first limiting position, the hydraulic mechanism 72 may block the supply of working fluid to the hydraulic chamber 72a. Therefore, the agricultural vehicle 1 according to the present disclosure is implemented so that, even when the driver keeps manipulating the clutch switch 43 even after the pressurization mechanism 71 has moved a sufficient distance as the clutch switch 43 is manipulated, the supply of working fluid to the hydraulic chamber 72a is automatically blocked when the pressurization mechanism 71 reaches the first limiting position. As the supply of working fluid to the hydraulic chamber 72a is blocked, the pressurization mechanism 71 stops. Therefore, the agricultural vehicle 1 according to the present disclosure may prevent deformation from occurring in the pressurization mechanism 71, the clutch switch link part 53, the clutch link part 51, the clutch 31, and the like due to excessive operation unintended by the driver. The first limiting position may be preset by a driver, a worker, or the like.

Upon sensing the pressurization mechanism 71 that has reached the first limiting position, the first sensing mechanism 70a may provide a first sensing signal to a controller (not illustrated). Upon receiving the first sensing signal, the controller may control the hydraulic mechanism 72 and block the supply of working fluid to the hydraulic chamber 72a. The first sensing signal may be provided to the controller through wired communication, wireless communication, or the like. The first sensing mechanism 70a may also provide the first sensing signal directly to the hydraulic mechanism 72.

The first sensing mechanism 70a may sense whether the pressurization mechanism 71 has reached the first limiting position by using a mechanical switch method. In this case, a protruding member 711 may be coupled to the pressurization mechanism 71. When the pressurization mechanism 71 reaches the first limiting position, the protruding member 711 may come in contact with the first sensing mechanism 70a. Upon coming in contact with the protruding member 711, the first sensing mechanism 70a may provide the first sensing signal to the controller. Although not illustrated, the first sensing mechanism 70a may also be implemented using a proximity sensor using magnetism, an optical sensor using light, a laser sensor using a laser, or the like.

When, as the hydraulic mechanism 72 supplies the working fluid to the hydraulic chamber 72a, the pressurization mechanism 71 is lifted and disengages the clutch 31 through the clutch switch link part 53 and the clutch link part 51, the pressurization mechanism 71 may be lifted by the working fluid supplied to the hydraulic chamber 72a and reach the first limiting position. When the first sensing mechanism 70a senses the pressurization mechanism 71 that has reached the first limiting position, the hydraulic mechanism 72 may block the supply of working fluid to the hydraulic chamber 72a by control by the controller. Therefore, the lifting of the pressurization mechanism 71 may be stopped.

Referring to FIGS. 31 and 32, the operation part 7 may include a second sensing mechanism 70b.

The second sensing mechanism 70b senses whether the pressurization mechanism 71 has reached a second limiting position. When, as the hydraulic mechanism 72 discharges the working fluid from the hydraulic chamber 72a, the pressurization mechanism 71 is lowered and engages the clutch 31 through the clutch switch link part 53 and the clutch link part 51, the pressurization mechanism 71 may be lowered and reach the second limiting position as the working fluid is discharged from the hydraulic chamber 72a. When the second sensing mechanism 70b senses the pressurization mechanism 71 that has reached the second limiting position, the hydraulic mechanism 72 may block the discharge of working fluid from the hydraulic chamber 72a by control by the controller. Therefore, the lowering of the pressurization mechanism 71 may be stopped. In this way, the agricultural vehicle 1 according to the present disclosure may be implemented so that the discharge of working fluid from the hydraulic chamber 72a is automatically blocked when the pressurization mechanism 71 reaches the second limiting position and thus may prevent deformation from occurring in the pressurization mechanism 71, the clutch switch link part 53, the clutch link part 51, the clutch 31, and the like due to excessive operation unintended by the driver. The second limiting position may be preset by a driver, a worker, or the like.

Upon sensing the pressurization mechanism 71 that has reached the second limiting position, the second sensing mechanism 70b may provide a second sensing signal to the controller. Upon receiving the second sensing signal, the controller may control the hydraulic mechanism 72 and block the discharge of working fluid from the hydraulic chamber 72a. The second sensing signal may be provided to the controller through wired communication, wireless communication, or the like. The second sensing mechanism 70b may also provide the second sensing signal directly to the hydraulic mechanism 72.

The second sensing mechanism 70b may sense whether the pressurization mechanism 71 has reached the second limiting position by using a mechanical switch method. When the pressurization mechanism 71 reaches the second limiting position, the protruding member 711 may come in contact with the second sensing mechanism 70b. Upon coming in contact with the protruding member 711, the second sensing mechanism 70*b* may provide the second sensing signal to the controller. Although not illustrated, the second sensing mechanism 70*b* may also be implemented using a proximity sensor using magnetism, an optical sensor using light, a laser sensor using a laser, or the like.

Referring to FIGS. 31 and 32, the hydraulic mechanism 72 may be implemented so that the supply and discharge of working fluid to and from the hydraulic chamber 72*a* selectively occur using the switching valve 72*d*.

The switching valve 72*d* may be implemented to be moved between a supply position at which the hydraulic chamber 72*a* and the supply line 72*e* are connected, a discharge position at which the hydraulic chamber 72*a* and the discharge line 72*f* are connected, and a blocking position at which the supply and discharge of working fluid to and from the hydraulic chamber 72*a* are blocked. The switching valve 72*d* may be moved between the supply position, the discharge position, and the blocking position according to whether the clutch switch 43 is being manipulated and the position of the pressurization mechanism 71.

First, when the clutch switch 43 is not manipulated, the switching valve 72*d* may be disposed at the blocking position. Accordingly, because the working fluid is not able to pass through the switching valve 72*d*, the supply and discharge of the working fluid to and from the hydraulic chamber 72*a* may be blocked. In this case, a blocking mechanism 72*d*1 (see FIG. 32) of the switching valve 72*d* may be connected to the supply line 72*e*, the discharge line 72*f*, and the hydraulic line 72*g*.

Next, when the clutch 31 is disengaged as the clutch switch 43 is manipulated, the switching valve 72*d* may be disposed at the supply position. Accordingly, the working fluid supplied by the hydraulic pump 72*b* may pass through the switching valve 72*d* and be supplied to the hydraulic chamber 72*a*, thus causing a pressurization mechanism 51 to be lifted. In this case, a supply mechanism 72*d*2 (see FIG. 32) of the switching valve 72*d* may be connected to the supply line 72*e*, the discharge line 72*f*, and the hydraulic line 72*g*. The supply mechanism 72*d*2 may connect the supply line 72*e* and the hydraulic line 72*g* and block the connection between the discharge line 72*f* and the hydraulic line 72*g*. When the first sensing mechanism 70*a* senses that the pressurization mechanism 51 has reached the first limiting position after being lifted, the switching valve 72*d* may be moved from the supply position to the blocking position. Accordingly, because the supply of working fluid to the hydraulic chamber 72*a* is blocked, the lifting of the pressurization mechanism 51 may be stopped.

Figure 33:
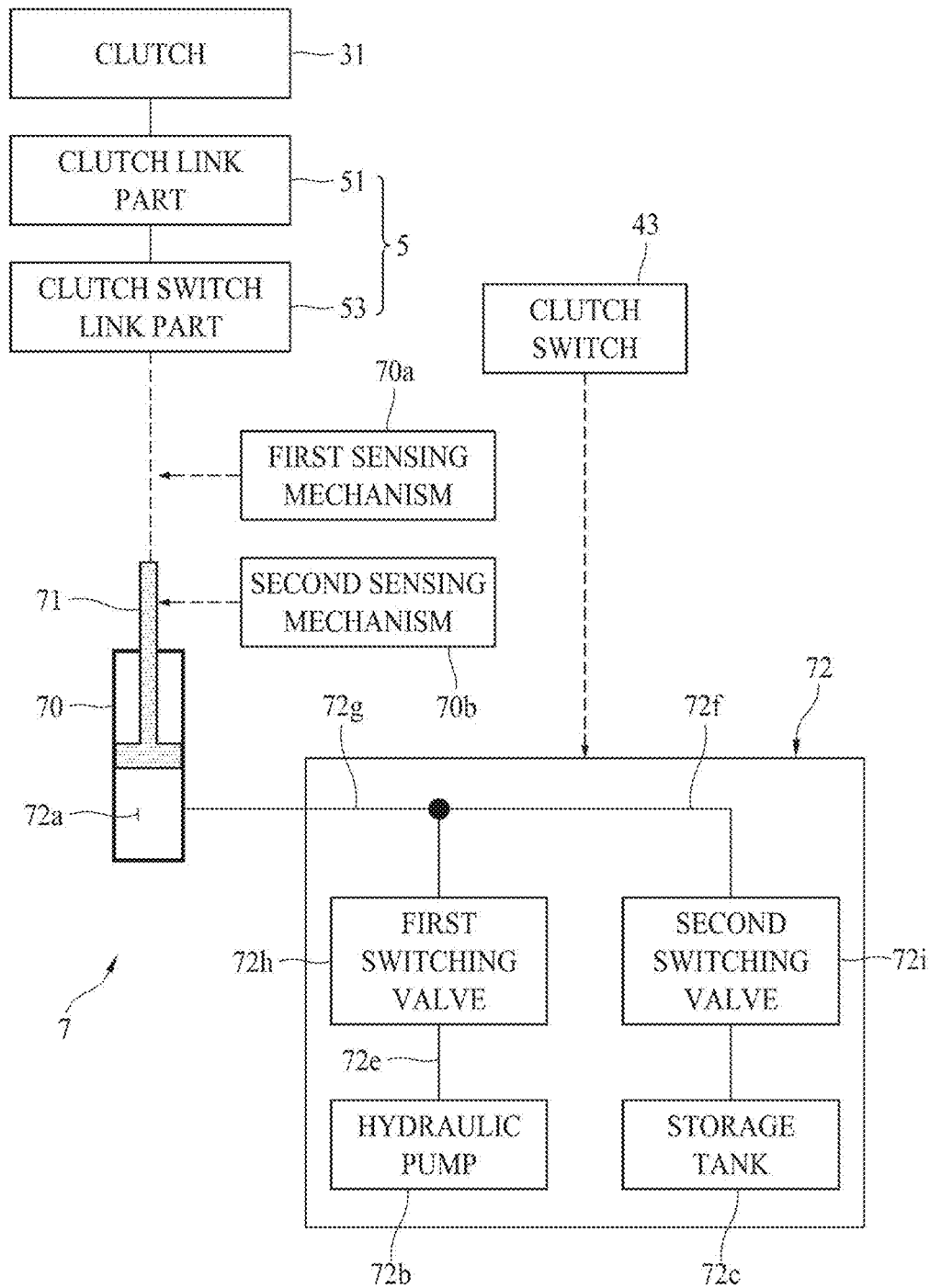
FIG. 33 is a schematic block diagram of an embodiment in which the supply and discharge of a working fluid to and from a hydraulic chamber is controlled using a first switching valve and a second switching valve.
Figure 34:
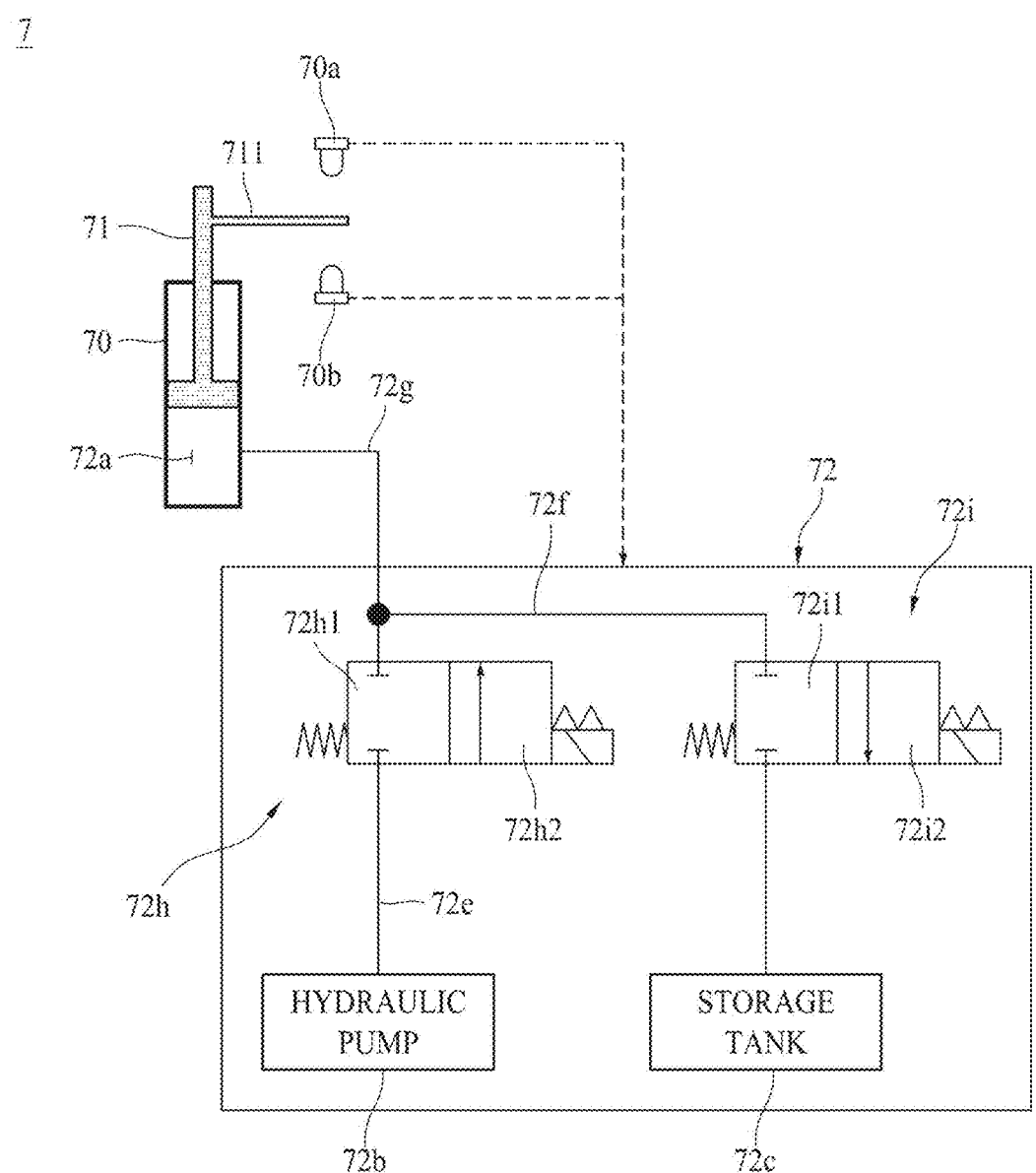
FIG. 34 is a schematic hydraulic pressure circuit diagram of an embodiment in which the supply and discharge of the working fluid to and from the hydraulic chamber is controlled using the first switching valve and the second switching valve.

Next, when the clutch 31 is engaged as the manipulation on the clutch switch 43 is released after the clutch switch 43 is manipulated, the switching valve 72*d* may be disposed at the discharge position. Accordingly, because the working fluid discharged from the hydraulic chamber 72*a* passes through the switching valve 72*b* and is discharged to the storage tank 72*c*, the pressurization mechanism 51 may be lowered. In this case, a discharge mechanism 72*d*3 (see FIG. 32) of the switching valve 72*d* may be connected to the supply line 72*e*, the discharge line 72*f*, and the hydraulic line 72*g*. The discharge mechanism 72*d*3 may connect the discharge line 72*f* and the hydraulic line 72*g* and block the connection between the supply line 72*e* and the hydraulic line 72*g*. When the second sensing mechanism 70*b* senses that the pressurization mechanism 51 has reached the second limiting position after being lowered, the switching valve 72*d* may be moved from the discharge position to the blocking position. Accordingly, because the discharge of working fluid from the hydraulic chamber 72*a* is blocked, the lowering of the pressurization mechanism 51 may be stopped Referring to FIGS. 33 and 34, the hydraulic mechanism 72 may be implemented so that the supply and discharge of working fluid to and from the hydraulic chamber 72*a* selectively occur using a first switching valve 72*h* and a second switching valve 72*i*.

The first switching valve 72*h* may be implemented to be moved between a supply position, at which the hydraulic chamber 72*a* and the hydraulic pump 72*b* are connected, and a supply blocking position, at which the connection between the hydraulic chamber 72*a* and the hydraulic pump 72*b* is blocked. The first switching valve 72*h* may have an inlet side connected to the supply line 72*e* and an outlet side connected to the hydraulic line 72*g*. The first switching valve 72*h* may be moved between the supply position and the supply blocking position according to whether the clutch switch 43 is being manipulated and the position of the pressurization mechanism 71.

The second switching valve 72*i* may be implemented to be moved between a discharge position, at which the hydraulic chamber 72*a* and the storage tank 72*c* are connected, and a discharge blocking position, at which the connection between the hydraulic chamber 72*a* and the storage tank 72*c* is blocked. The discharge line 72*f* may have one side connected to the hydraulic line 72*g* at the outlet side of the first switching valve 72*h* and the other side connected to the storage tank 72*c*. The second switching valve 72*i* may be installed in the discharge line 72*f*. The second switching valve 72*i* may be moved between the discharge position and the discharge blocking position according to whether the clutch switch 43 is being manipulated and the position of the pressurization mechanism 71.

The second switching valve 72*i* and the first switching valve 72*h* may operate as follows.

First, when the clutch switch 43 is not manipulated, the first switching valve 72*h* may be disposed at the supply blocking position. The second switching valve 72*i* may be disposed at the discharge blocking position. Accordingly, both the supply and discharge of working fluid to and from the hydraulic chamber 72*a* may be blocked. In this case, a supply blocking mechanism 72*h*1 (see FIG. 34) of the first switching valve 72*h* may be connected to the supply line 72*e* and the hydraulic line 72*g*. A discharge blocking mechanism 72*i*1 (see FIG. 34) of the second switching valve 72*i* may be connected to the discharge line 72*h*.

Next, when the clutch 31 is disengaged as the clutch switch 43 is manipulated, the first switching valve 72*h* may be disposed at the supply position. Accordingly, the working fluid supplied by the hydraulic pump 72*b* may pass through the first switching valve 72*h* and be supplied to the hydraulic chamber 72*a*, thus causing the pressurization mechanism 51 to be lifted. In this case, a supply mechanism 72*h*2 (see FIG. 34) of the first switching valve 72*h* may be connected to the supply line 72*e* and the hydraulic line 72*g*. When the first sensing mechanism 70*a* senses that the pressurization mechanism 51 has reached the first limiting position after being lifted, the first switching valve 72*h* may be moved from the supply position to the supply blocking position. Accordingly, because the supply of working fluid to the hydraulic chamber 72*a* is blocked, the lifting of the pressurization mechanism 51 may be stopped. While the first switching valve 72*h* is being placed at the supply position and moved to the supply blocking position, the second switching valve 72*i* may be maintained in the state of being placed at the discharge blocking position.

Next, when the clutch 31 is engaged as the manipulation on the clutch switch 43 is released after the clutch switch 43 is manipulated, the second switching valve 72i may be disposed at the discharge position. Accordingly, because the working fluid discharged from the hydraulic chamber 72a passes through the second switching valve 72i and is discharged to the storage tank 72c, the pressurization mechanism 51 may be lowered. In this case, a discharge mechanism 72i1 (see FIG. 34) of the second switching valve 72i may be connected to the discharge line 72f. When the second sensing mechanism 70b senses that the pressurization mechanism 51 has reached the second limiting position after being lowered, the second switching valve 72i may be moved from the discharge position to the discharge blocking position. Accordingly, because the discharge of working fluid from the hydraulic chamber 72a is blocked, the lowering of the pressurization mechanism 51 may be stopped. While the second switching valve 72i is being placed at the discharge position and moved to the discharge blocking position, the first switching valve 72h may be maintained in the state of being placed at the supply blocking position.

Meanwhile, even when the hydraulic mechanism 72 includes the first switching valve 72h and the second switching valve 72i, the pressurization mechanism 71 and the hydraulic mechanism 72 may be modularized using the operation main body 70, or the first switching valve 72h and the second switching valve 72i of the hydraulic mechanism 72 may be disposed inside the operation main body 70 and modularized with the pressurization mechanism 71.

Figure 35:
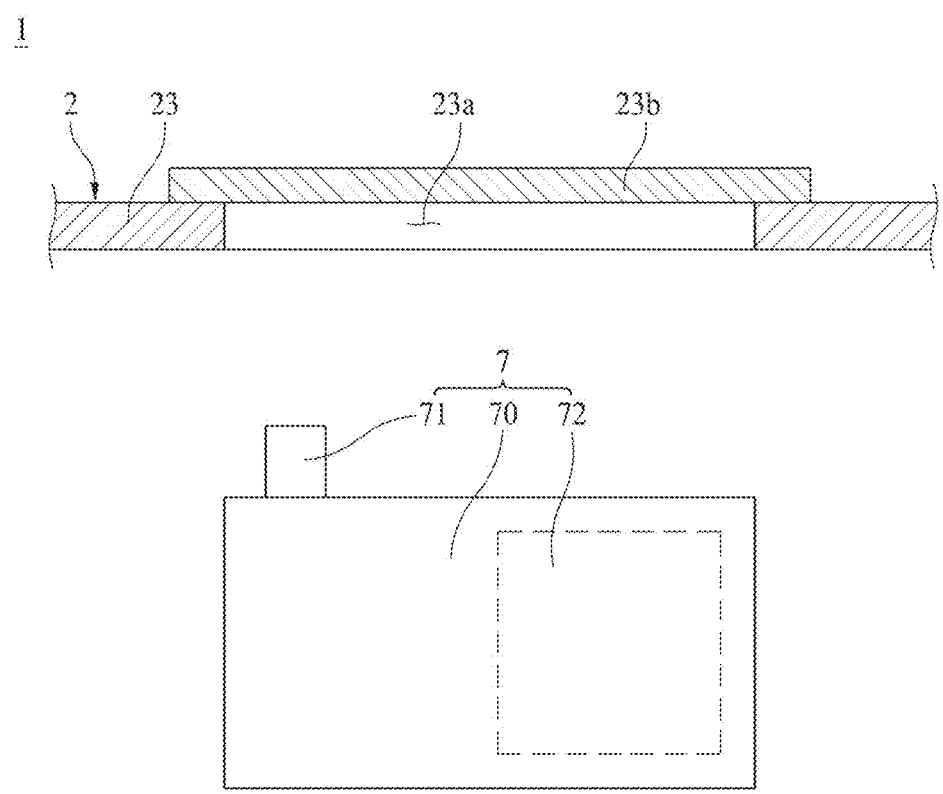
FIG. 35 is a conceptual side view for describing a positional relationship of the operation part with respect to a footrest.

Referring to FIG. 35, the operation part 7 may be disposed below a footrest 23 provided in the vehicle main body 2. That is, the operation part 7 may be disposed below a stepping surface. The operation part 7 may be disposed below a maintenance hole 23a formed to pass through the footrest 23. Accordingly, in the state in which the operation part 7 is disposed below the footrest 23, maintenance work such as inspection work and repair work may be performed on the operation part 7 through the maintenance hole 23a. Therefore, the agricultural vehicle 1 according to the present disclosure may improve ease of maintenance work on the operation part 7.

A maintenance member 23b may be coupled to the footrest 23. The maintenance member 23b may be detachably coupled to the footrest 23 so as to block the maintenance hole 23a. When performing maintenance work on the operation part 7, a worker may separate the maintenance member 23b from the footrest 23 so that the maintenance hole 23a is opened. When not performing the maintenance work on the operation part 7, the worker may couple the maintenance member 23b to the footrest 23 so that the maintenance hole 23a is blocked. In this case, the maintenance member 23b may also be implemented to perform a function of supporting a foot of the worker.

Figure 36:
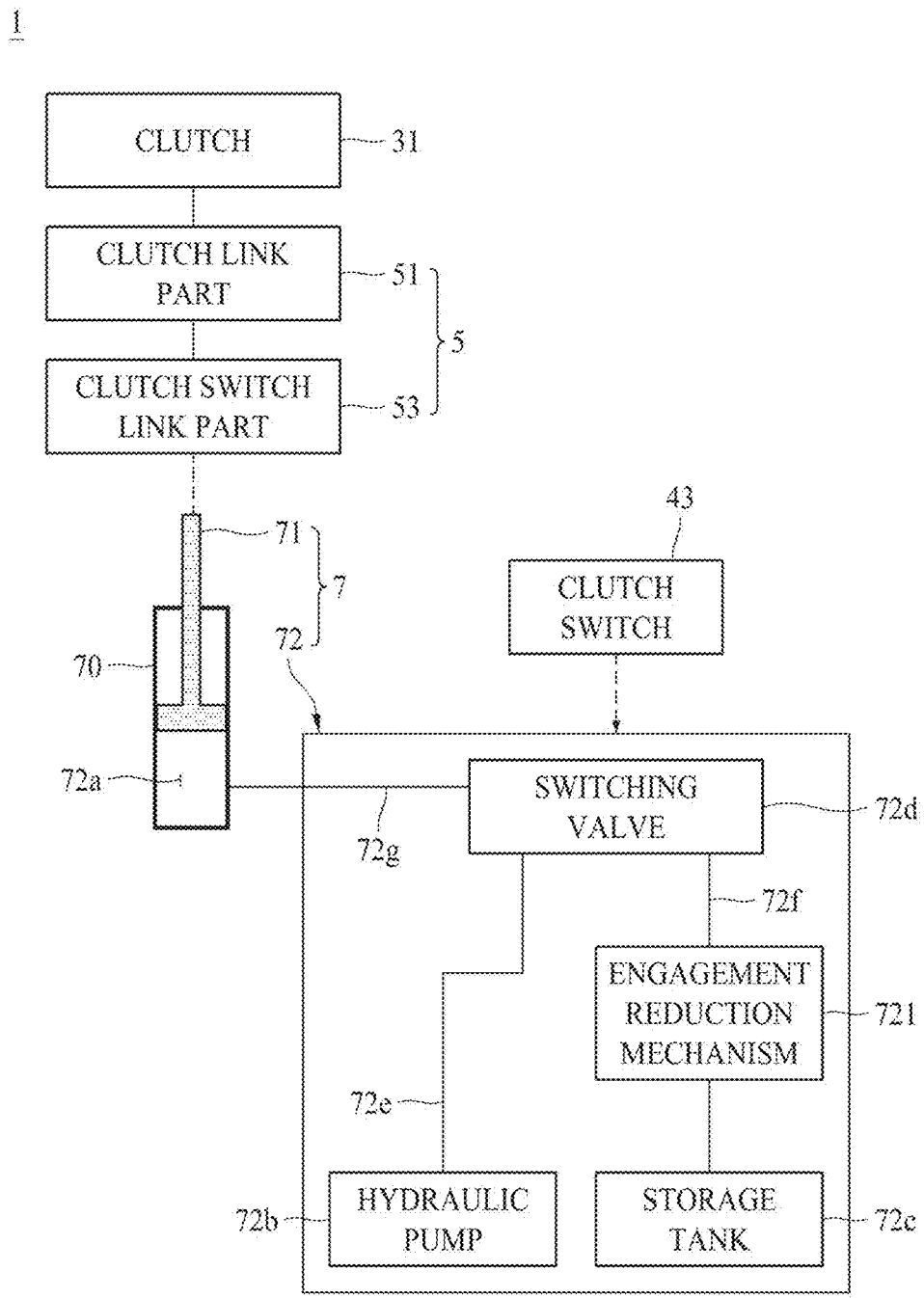
FIG. 36 is a schematic block diagram of the operation part including an engagement reduction mechanism.

Referring to FIG. 36, the hydraulic mechanism 72 may include an engagement reduction mechanism 72l.

The engagement reduction mechanism 72l decreases a discharge speed of the working fluid being discharged from the hydraulic chamber 72a. Accordingly, the engagement reduction mechanism 72l may decrease the speed at which the pressurization mechanism 71 is lowered, thereby decreasing a rotation speed of the clutch switch link part 53 and a rotation speed of the clutch link part 51. Therefore, the engagement reduction mechanism 72l may decrease an engagement speed of the clutch 31.

Figure 37:
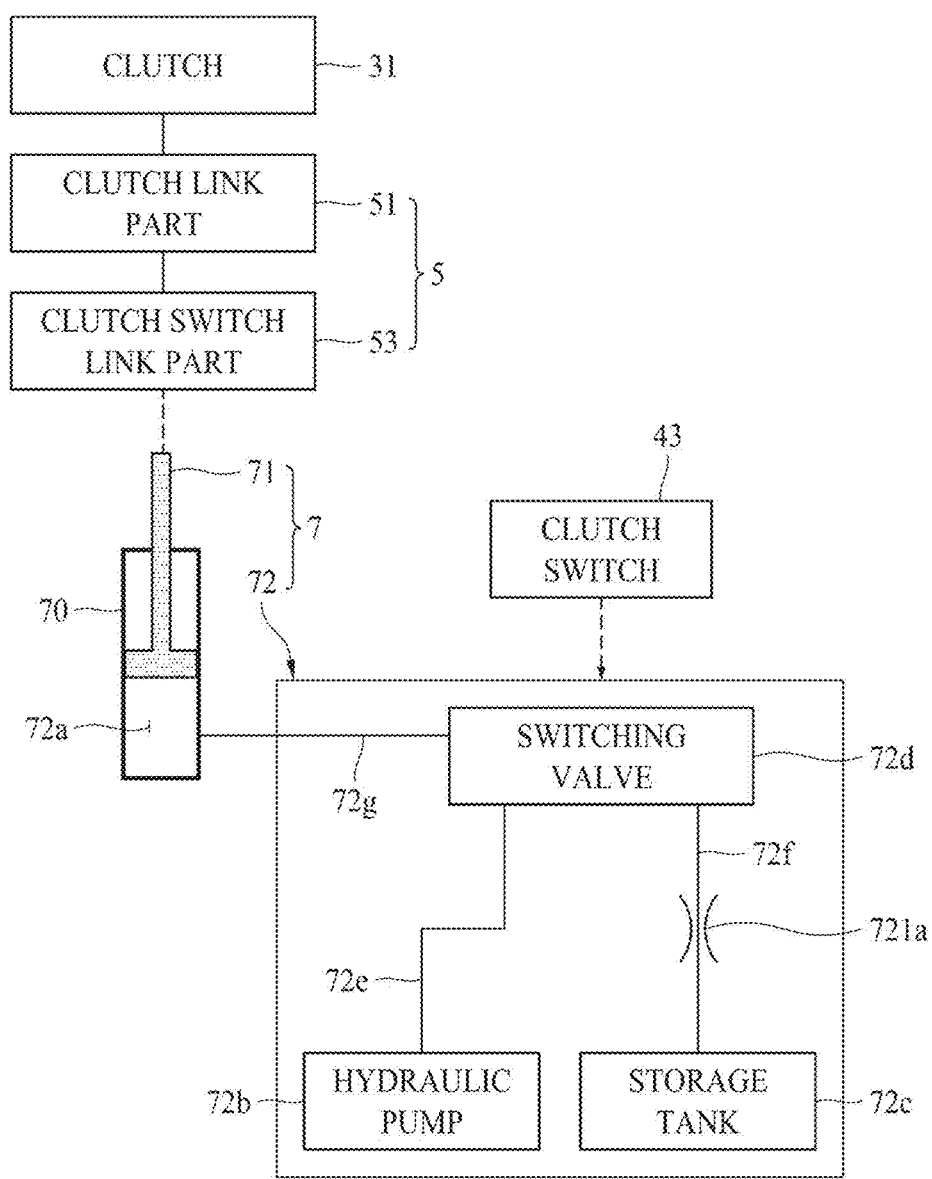
FIG. 37 is a schematic block diagram of an embodiment in which an orifice is coupled to a discharge line.
Figure 38:
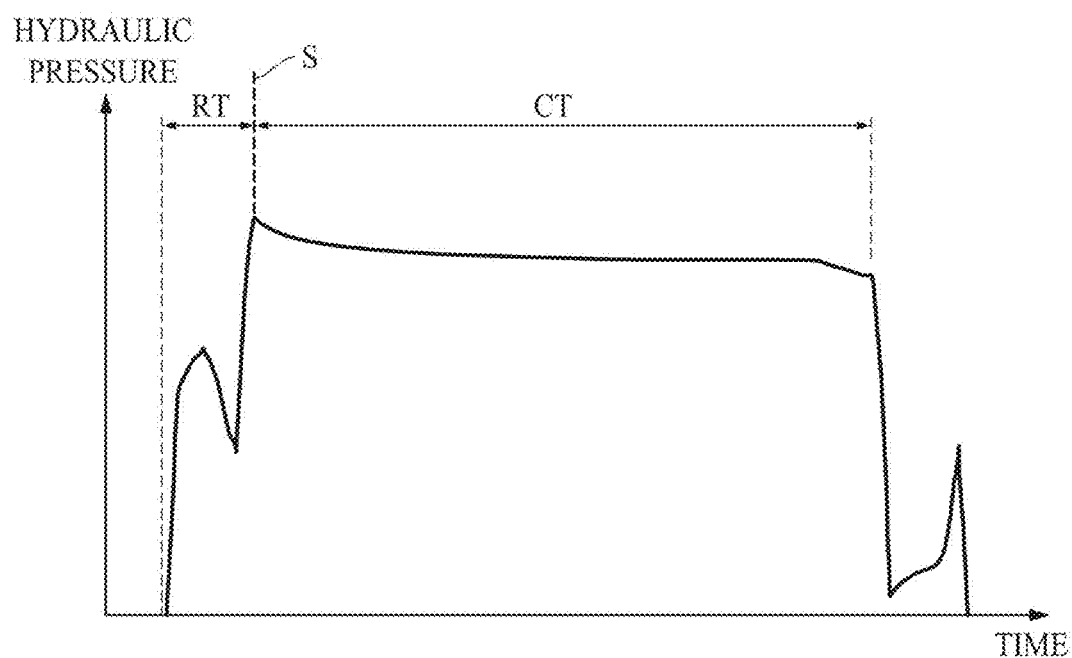
FIG. 38 is a graph showing changes in a hydraulic pressure over time in the embodiment in which the orifice is coupled to the discharge line.

Referring to FIGS. 36 to 38, the engagement reduction mechanism 72l may be implemented as an orifice 721a that decreases a flow rate of working fluid passing per unit time.

The orifice 721a may be coupled to the discharge line 72f. A passing area in which the orifice 721a passes the working fluid may be formed smaller than a passing area in which the discharge line 72f passes the working fluid. Accordingly, by decreasing the flow rate of working fluid passing per unit time, the orifice 721a may decrease a discharge speed of the working fluid being discharged from the hydraulic chamber 72a.

Therefore, an engagement time CT (see FIG. 38) taken for the clutch 31 to be engaged as the working fluid is discharged from the hydraulic chamber 72a may be implemented to be longer than a disengagement time RT (see FIG. 38) taken for the clutch 31 to be disengaged as the working fluid is supplied to the hydraulic chamber 72a. Also, it can be seen that a hydraulic pressure of the hydraulic chamber 72a gradually decreases from a time point S (see FIG. 38) at which the hydraulic pressure of the hydraulic chamber 72a begins to decrease. From this, it can be seen that, using the orifice 721a coupled to the discharge line 72f, the hydraulic mechanism 72 implements the engagement speed of the clutch 31 to be lower than the disengagement speed of the clutch 31. In FIG. 38, the horizontal axis indicates time, and the vertical axis indicates the hydraulic pressure of the hydraulic chamber 72a.

In this way, the engagement reduction mechanism 72l may be implemented according to a first embodiment in which the engagement reduction mechanism 72l uses the orifice 721a coupled to the discharge line 72f to decrease the flow rate of working fluid passing per unit time in the discharge line 72f. Thus, because the discharge speed of the working fluid being discharged from the hydraulic chamber 72a is decreased, the clutch 31 may be implemented so that the engagement speed is lower than the disengagement speed.

Figure 39:
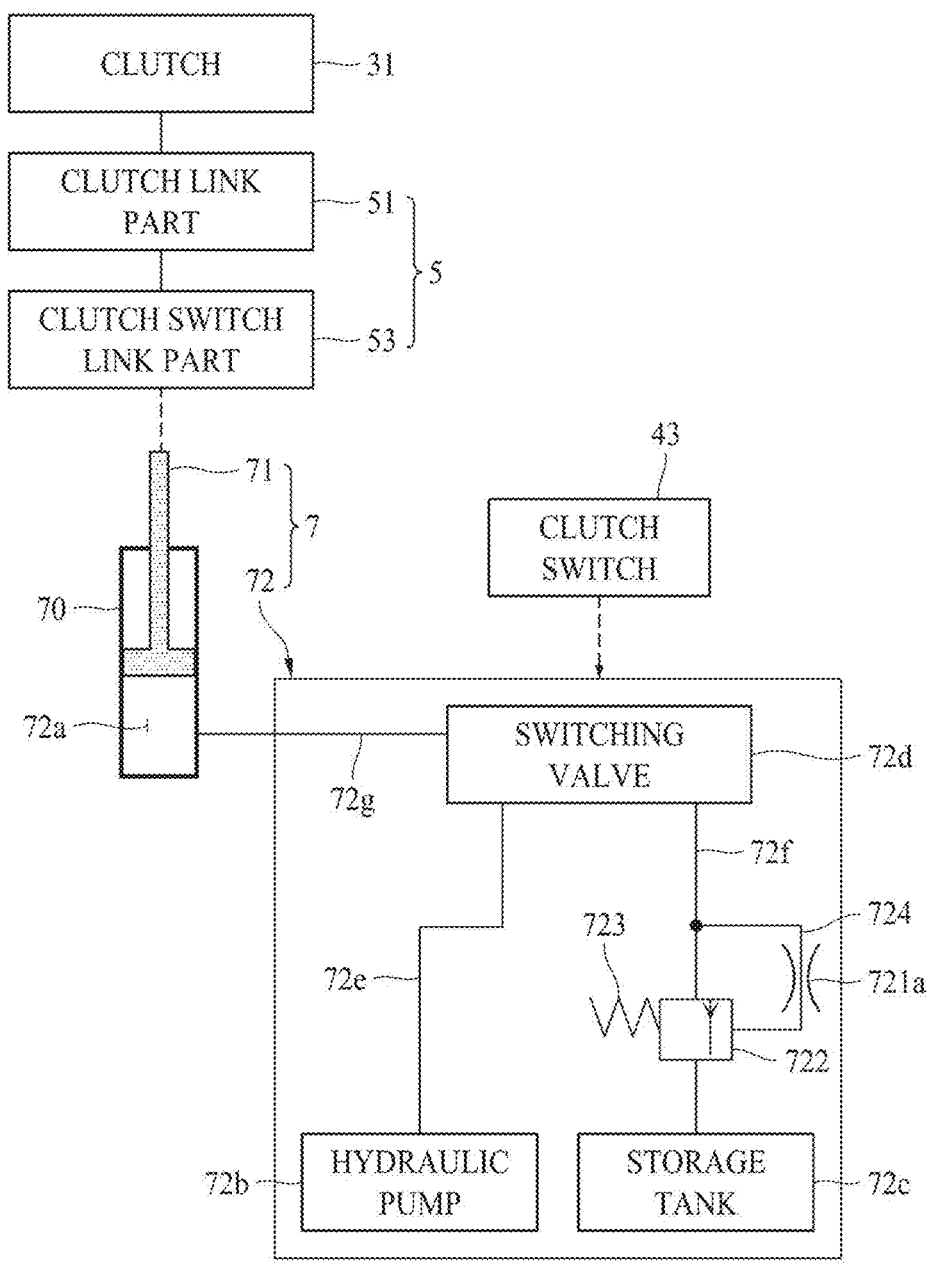
FIG. 39 is a schematic block diagram of an embodiment in which an orifice is coupled to a control line.
Figure 40:
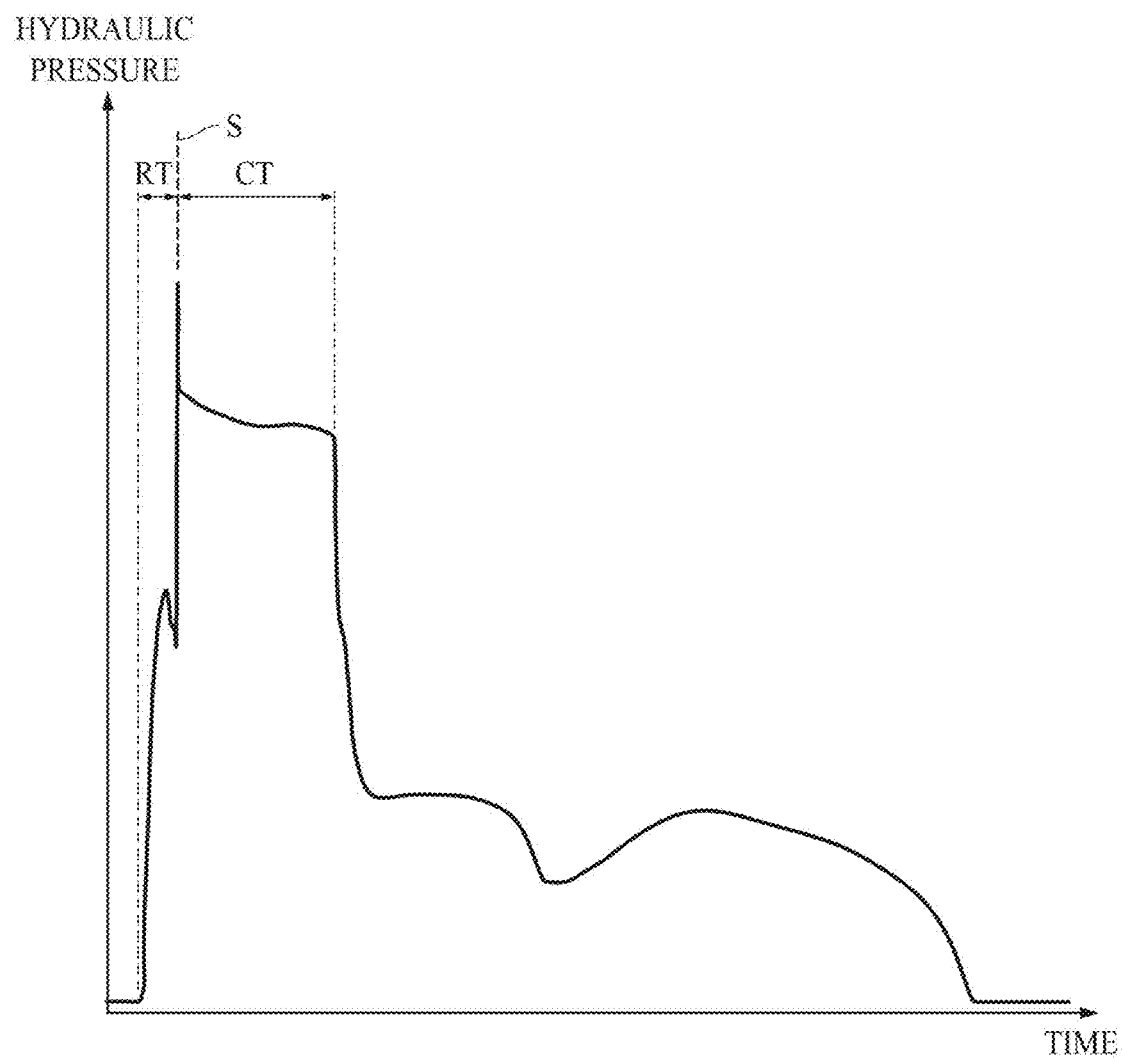
FIG. 40 is a graph showing changes in a hydraulic pressure over time in the embodiment in which the orifice is coupled to the control line.

Referring to FIGS. 39 and 40, the hydraulic mechanism 72 may include a discharge valve 722, an elastic member 723, and a control line 724.

The discharge valve 722 is coupled to the discharge line 72f and selectively passes the working fluid. When the discharge valve 722 is disposed at a blocking position at which the discharge valve 722 blocks the passage of working fluid, the working fluid discharged from the hydraulic chamber 72a is not able to be discharged to the storage tank 72c. When the discharge valve 722 is disposed at an opening position at which the discharge valve 722 allows the passage of working fluid, the working fluid discharged from the hydraulic chamber 72a may be discharged to the storage tank 72c. As illustrated in FIG. 39, a state in which an arrow marked inside the discharge valve 722 and the discharge line 72f are misaligned corresponds to a state in which the discharge valve 722 is disposed at the blocking position. Although not illustrated, a state in which the arrow marked inside the discharge valve 722 and the discharge line 72f are connected corresponds to a state in which the discharge valve 722 is disposed at the opening position.

The elastic member 723 elastically presses the discharge valve 722 so that the discharge valve 722 moves to the blocking position. The elastic member 723 may be disposed at one side of the discharge valve 722. The elastic member 723 may be a spring.

The control line 724 presses the discharge valve 722 using the hydraulic pressure of the working fluid discharged along the discharge line 72f so that the discharge valve 722 moves to the opening position. One side of the control line 724 may be connected to the discharge line 72f at an inlet side of the discharge valve 722. The other side of the control line 724 may be connected to the other side of the discharge valve 722. When the hydraulic pressure of the working fluid flowing along the control line 724 is larger than an elastic force of the elastic member 723, the discharge valve 722 may be moved to the opening position. When the hydraulic pressure of the working fluid flowing along the control line 724 is smaller than the elastic force of the elastic member 723, the discharge valve 722 may be moved to the blocking position.

The orifice 721a may be coupled to the control line 724. The passing area in which the orifice 721a passes the working fluid may be formed smaller than a passing area in which the control line 724 passes the working fluid. Accordingly, by decreasing the flow rate of working fluid passing per unit time, the orifice 721a may increase the time taken for the discharge valve 722 to be placed at the opening position. Therefore, the engagement time CT (see FIG. 40) may be implemented to be longer than the disengagement time RT (see FIG. 40). Also, it can be seen that the hydraulic pressure of the hydraulic chamber 72a gradually decreases from the time point S (see FIG. 40) at which the hydraulic pressure of the hydraulic chamber 72a begins to decrease. From this, it can be seen that, using the orifice 721a coupled to the control line 724, the hydraulic mechanism 72 implements the engagement speed of the clutch 31 to be lower than the disengagement speed of the clutch 31. In FIG. 40, the horizontal axis indicates time, and the vertical axis indicates the hydraulic pressure of the hydraulic chamber 72a.

In this way, the engagement reduction mechanism 72l may be implemented according to a second embodiment in which the engagement reduction mechanism 72l uses the orifice 721a coupled to the control line 724 to decrease the flow rate of working fluid passing per unit time in the control line 724. Thus, because the discharge speed of the working fluid being discharged from the hydraulic chamber 72a is decreased, the clutch 31 may be implemented so that the engagement speed is lower than the disengagement speed.

Referring to FIGS. 36 to 38 and 41, the agricultural vehicle 1 according to the present disclosure may include an adjustment mechanism 73.

The adjustment mechanism 73 may be connected to the engagement reduction mechanism 72l so as to be able to adjust the discharge speed of the working fluid being discharged from the hydraulic chamber 72a. In this case, in the first embodiment in which the flow rate of working fluid passing per unit time in the discharge line 72f is decreased, the engagement reduction mechanism 72l may be implemented as a variable orifice 721b (see FIG. 41) coupled to the discharge line 72f.

Figure 41:
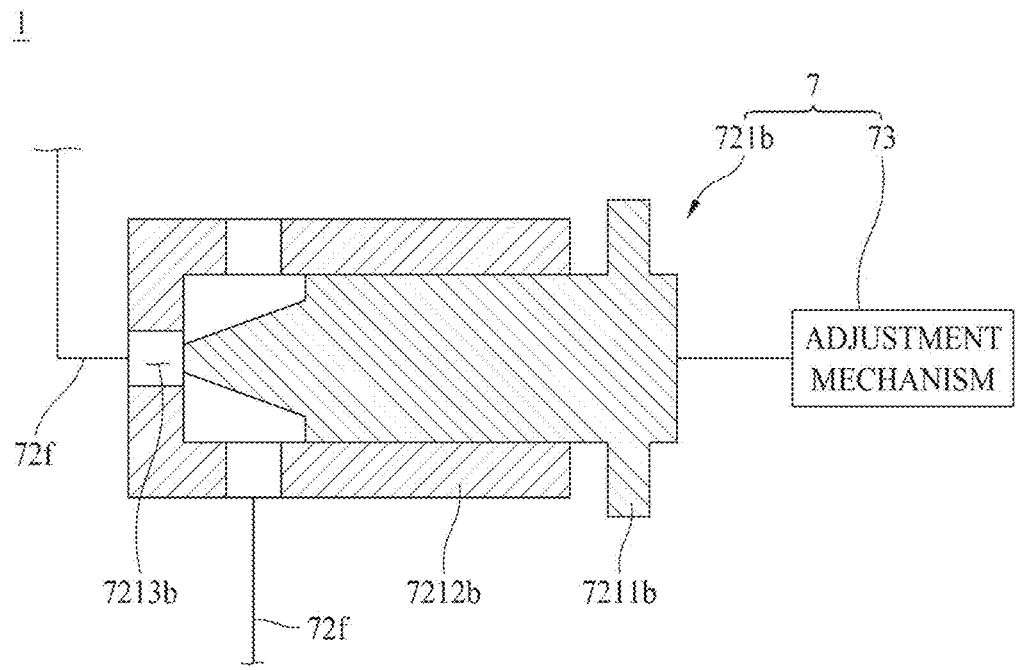
FIG. 41 is a schematic cross-sectional view of a variable orifice connected to an adjustment mechanism.

As illustrated in FIG. 41, the variable orifice 721b may include a variable member 7211b connected to the adjustment mechanism 73, a variable main body 7212b to which the variable member 7211b is coupled, and a variable hole 7213b formed in the variable main body 7212b. The variable member 7211b may be coupled to the variable main body 7212b so as to be rotatable and movable. An extent to which the variable member 7211b is inserted into the variable main body 7212b may be adjusted according to a direction of rotation of the variable member 7211b and an angle of rotation of the variable member 7211b. Accordingly, an extent to which the variable member 7211b blocks the variable hole 7213b may be adjusted. As the extent to which the variable member 7211b blocks the variable hole 7213b increases, the size of the passing area in which the variable orifice 721b passes the working fluid may be decreased. As the extent to which the variable member 7211b blocks the variable hole 7213b decreases, the size of the passing area in which the variable orifice 721b passes the working fluid may be increased.

By adjusting the size of the passing area in which the variable orifice 721b passes the working fluid, the adjustment mechanism 73 may adjust the discharge speed of the working fluid being discharged from the hydraulic chamber 72a. In this case, the adjustment mechanism 73 may be connected to the variable member 7211b. By adjusting the direction of rotation of the variable member 7211b and the angle of rotation of the variable member 7211b, the adjustment mechanism 73 may adjust the size of the passing area in which the variable orifice 721b passes the working fluid. As the size of the passing area in which the variable orifice 721b passes the working fluid is adjusted by the adjustment mechanism 73, in FIG. 38, the slope of the hydraulic pressure graph that corresponds to the flow rate of working fluid passing per unit time may be changed, and the engagement time CT may be changed. The adjustment mechanism 73 may be manipulated by the driver.

Figure 42:
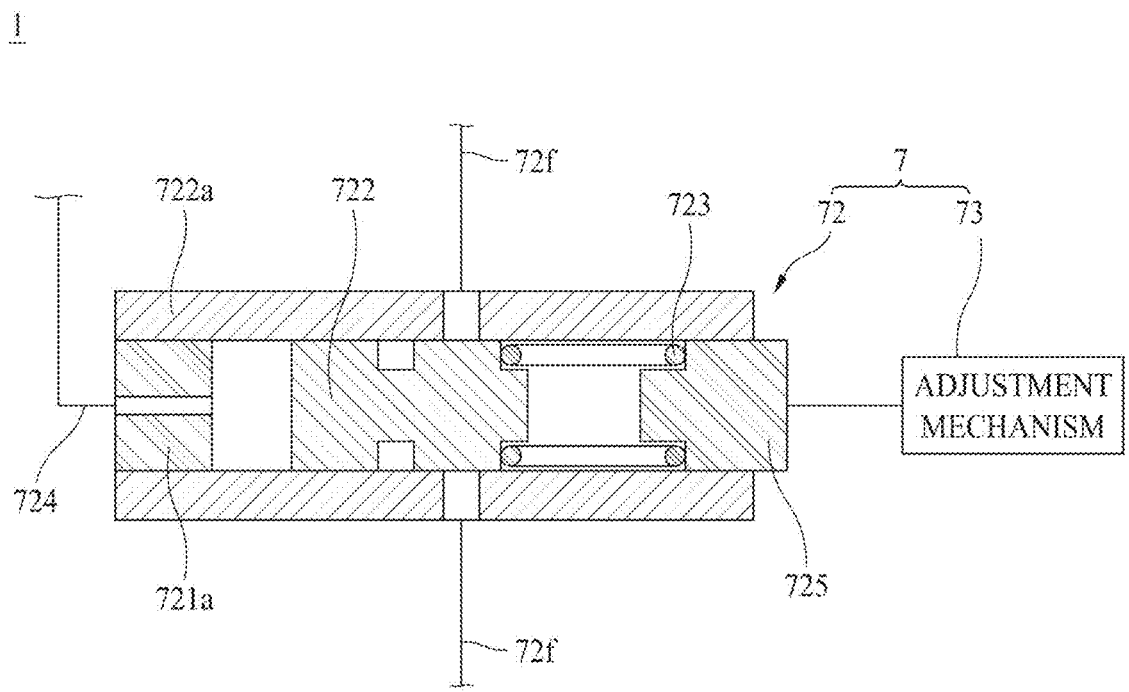
FIG. 42 is a schematic cross-sectional view of a discharge valve connected to the adjustment mechanism.

Referring to FIGS. 39, 40, and 42, the adjustment mechanism 73 may be connected to the hydraulic mechanism 72 so as to adjust an opening time taken for the discharge valve 722 to be placed at the opening position. In this case, in the second embodiment in which the flow rate of working fluid passing per unit time in the control line 724 is decreased, the hydraulic mechanism 72 may include a support member 725.

As illustrated in FIG. 42, the support member 725 supports one side of the elastic member 723. The elastic member 723 may be disposed so that one side is supported by the support member 725 and the other side presses the discharge valve 722. The discharge valve 722 may be movably coupled to a valve main body 722a. The discharge valve 722 may be disposed between the orifice 721a and the elastic member 723. The discharge valve 722 may move between the opening position and the blocking position according to the hydraulic pressure of the working fluid supplied to the inside of the valve main body 722a through the orifice 721a and the size of the elastic force of the elastic member 723. The support member 722 may be coupled to the valve main body 722a so as to be rotatable and movable. An extent to which the support member 725 is inserted into the valve main body 722a may be adjusted according to a direction of rotation of the support member 725 and an angle of rotation of the support member 725. Accordingly, the time taken for the discharge valve 722 to be placed at the opening position may be adjusted. In FIG. 42, as the support member 725 moves leftward, a hydraulic pressure necessary for moving the discharge valve 722 to the opening position may be increased. Accordingly, because the opening time increases, the engagement time CT (see FIG. 40) may increase. In FIG. 42, as the support member 725 moves rightward, the hydraulic pressure necessary for moving the discharge valve 722 to the opening position may be decreased. Accordingly, because the opening time decreases, the engagement time CT may decrease.

Meanwhile, although the orifice 721a is illustrated in FIG. 42 as being coupled to the valve main body 722a, the present disclosure is not limited thereto, and the orifice 721a may also be formed as a configuration separate from the valve main body 722a.

By adjusting the position of the support member 725, the adjustment mechanism 73 may adjust the engagement time CT taken for the clutch 31 to be engaged. In this case, the adjustment mechanism 73 may be connected to the support member 725. By adjusting the direction of rotation of the support member 725 and the angle of rotation of the support member 725, the adjustment mechanism 73 may adjust the position of the support member 725.

In this way, the agricultural vehicle 1 according to the present disclosure is implemented to adjust responsiveness of the clutch 31, such as the engagement speed of the clutch 31 and the engagement time CT of the clutch 31, using the adjustment mechanism 73. Therefore, because the responsiveness of the clutch 31 may be easily adjusted according to the driver's sensitivity, the agricultural vehicle 1 according to the present disclosure may further improve convenience for the driver.

Figure 43:
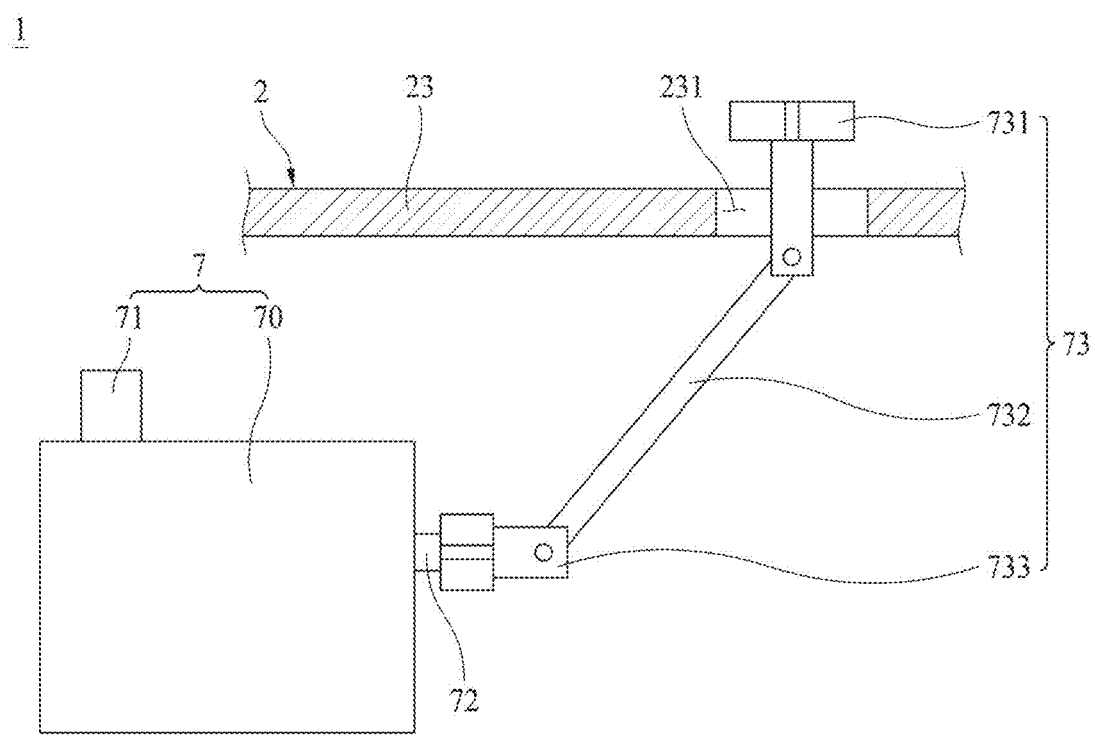
FIG. 43 is a conceptual side view for describing a connection relationship between the adjustment mechanism and a hydraulic mechanism.

Referring to FIGS. 41 to 43, the adjustment mechanism 73 may include a manipulating member 731, a connecting member 732, and an adjusting member 733.

The manipulating member 731 is rotatably coupled to the vehicle main body 2. The manipulating member 731 may be manipulated by a hand of the driver. In this case, the manipulating member 731 may be coupled to the vehicle main body 2 so as to be disposed at a position that allows the driver in the driver's seat 21 (see FIG. 1) to manipulate the manipulating member 731 with his or her hand.

The connecting member 732 connects the manipulating member 731 and the adjusting member 733 so that the adjusting member 733 rotates as the manipulating member 731 rotates. The connecting member 732 may be implemented to transmit a rotary force of the manipulating member 731 to the adjusting member 733 even when a rotating shaft of the manipulating member 731 and a rotating shaft of the adjusting member 733 are disposed in different directions. In this case, the adjustment mechanism 73 may be implemented as a universal joint.

The adjusting member 733 is connected to the hydraulic mechanism 72. When the rotary force of the manipulating member 731 is transmitted to the adjusting member 733 through the connecting member 732, the adjusting member 733 may control the hydraulic mechanism 72 while rotating.

In the case of the first embodiment in which the flow rate of working fluid passing per unit time in the discharge line 72$f$ is decreased, the adjusting member 733 may be coupled to the variable member 7211$b$. In this case, the adjusting member 733 may adjust the engagement time CT of the clutch 31 by moving the variable member 7211$b$ while rotating according to a direction of rotation of the manipulating member 731 and an angle of rotation of the manipulating member 731.

In the case of the second embodiment in which the flow rate of working fluid passing per unit time in the control line 724 is decreased, the adjusting member 733 may be coupled to the support member 725. In this case, the adjusting member 733 may adjust the engagement time CT of the clutch 31 by moving the support member 725 while rotating according to the direction of rotation of the manipulating member 731 and the angle of rotation of the manipulating member 731.

Here, when the hydraulic mechanism 72 is disposed below the footrest 23 (see FIG. 43), at least a portion of the manipulating member 731 may be disposed above the footrest 23. That is, at least a portion of the manipulating member 731 may be disposed above the stepping surface. Accordingly, the agricultural vehicle 1 according to the present disclosure is implemented to allow the driver to manipulate the manipulating member 713 while being in the vehicle main body 2. Therefore, the agricultural vehicle 1 according to the present disclosure may further improve ease of adjusting the responsiveness of the clutch 31 according to the driver's sensitivity.

When the hydraulic mechanism 72 is disposed below the footrest 23 and at least a portion of the manipulating member 731 is disposed above the footrest 23, the adjusting member 733 may be coupled to the variable member 7211$b$ or the support member 725 below the footrest 23. The connecting member 732 may connect the manipulating member 731, at least a portion of which is disposed above the footrest 23, and the adjusting member 733 which is disposed below the footrest 23. In this case, a footrest hole 231 (see FIG. 43) may be formed in the footrest 23. The manipulating member 731 may be inserted into the footrest hole 231. Although the manipulating member 731 is illustrated in FIG. 43 as having one portion disposed above the footrest 23 and the other portion disposed below the footrest 23, the present disclosure is not limited thereto, and the manipulating member 731 may also be entirely disposed above the footrest 23. In this case, the connecting member 732 may be inserted into the footrest hole 231 and connected to the manipulating member 731 above the footrest 23.

The present disclosure described above is not limited to the above-described embodiments and the accompanying drawings. It should be apparent to those of ordinary skill in the art to which the present disclosure pertains that various substitutions, modifications, and changes are possible within the scope not departing from the technical idea of the present disclosure.

The invention claimed is:

1. An agricultural vehicle comprising:
   a vehicle main body configured to support an engine of the agricultural vehicle;
   a transmission coupled to the vehicle main body and configured to perform shifting with respect to drive generated by the engine;
   a clutch pedal provided in a driver's seat of the vehicle main body so that the driver is able to manipulate the clutch pedal with his or her feet;
   a hand lever provided in the driver's seat so that the driver is able to manipulate the hand lever with his or her hand;
   a clutch switch coupled to the hand lever;
   a clutch link part configured to be rotatable about a connection shaft and connected to a clutch of the transmission so as to be engaged to and disengaged from the clutch;
   a clutch pedal link part coupled to the clutch link part so as to rotate together with the clutch link part about the connection shaft;
   a pedal link part connected to each of the clutch pedal link part and the clutch pedal so as to rotate the clutch link part about the connection shaft as the clutch pedal is manipulated;
   a clutch switch link part coupled to the clutch link part so as to rotate together with the clutch link part about the connection shaft;
   an operation part configured to rotate the clutch switch link part about the connection shaft so as to rotate the clutch link part about the connection shaft as the clutch switch is manipulated; and
   a pedal connecting part configured to connect the clutch pedal link part and the pedal link part so that, when the clutch switch is manipulated, the clutch pedal link part rotates independently of the pedal link part and, when the clutch pedal is manipulated, the clutch pedal link part interlocks with the pedal link part and rotates.

2. The agricultural vehicle of claim 1, wherein:
   the pedal connecting part includes a pedal hole formed in the shape of a slot in the clutch pedal link part in a direction in which the clutch pedal link part rotates about the connection shaft, and a pedal connecting member coupled to the pedal link part so as to be inserted into the pedal hole;

when neither of the clutch pedal and the clutch switch is manipulated, the pedal connecting member is disposed at an uppermost portion of the pedal hole;

when the clutch switch is manipulated, as the clutch link part rotates about the connection shaft, the clutch pedal link part lifts the pedal hole, into which the pedal connecting member is inserted, so as to rotate independently of the pedal link part; and when the clutch pedal is manipulated, as the pedal link part is lifted, the pedal connecting member is lifted together with the pedal link part and rotates the clutch pedal link part about the connection shaft.

3. The agricultural vehicle of claim 1, wherein:

the pedal connecting part includes a pedal hole formed in the shape of a slot in the pedal link part in a direction in which the clutch pedal link part rotates about the connection shaft, and a pedal connecting member coupled to the clutch pedal link part so as to be inserted into the pedal hole;

when neither of the clutch pedal and the clutch switch is manipulated, the pedal connecting member is disposed at a lowermost portion of the pedal hole;

when the clutch switch is manipulated, as the clutch link part rotates about the connection shaft, the clutch pedal link part lifts the pedal connecting member in the pedal hole so as to rotate independently of the pedal link part; and when the clutch pedal is manipulated, as the pedal link part is lifted, the pedal connecting member is lifted by being pushed by the pedal link part and rotates the clutch pedal link part about the connection shaft.

4. The agricultural vehicle of claim 1, wherein:

the pedal connecting part includes a pedal groove formed in the pedal link part;

when neither of the clutch pedal and the clutch switch is manipulated, the clutch pedal link part is inserted into the pedal groove;

when the clutch switch is manipulated, the clutch pedal link part is detached from the pedal groove so as to rotate independently of the pedal link part as the clutch link part rotates about the connection shaft; and when the clutch pedal is manipulated, the clutch pedal link part is lifted by being pushed by the pedal link part and rotates about the connection shaft, as the pedal link part is lifted.

5. The agricultural vehicle of claim 1, further comprising a switch connecting part configured to connect the clutch switch link part and the operation part so that, when the clutch pedal is manipulated, the clutch switch link part rotates independently of the operation part, and, when the clutch switch is manipulated, the clutch switch link part interlocks with the operation part and rotates.

6. The agricultural vehicle of claim 5, wherein:

the operation part includes a pressurization mechanism configured to be lifted or lowered according to whether the clutch switch is manipulated;

the switch connecting part includes a switch groove formed in the pressurization mechanism;

when neither of the clutch pedal and the clutch switch is manipulated, the clutch switch link part is inserted into the switch groove;

when the clutch pedal is manipulated, the clutch switch link part is detached from the switch groove so as to rotate independently of the pressurization mechanism as the clutch link part rotates about the connection shaft; and when the clutch switch is manipulated, the clutch switch link part is lifted by being pushed by the pressurization mechanism and rotates about the connection shaft as the pressurization mechanism is lifted.

7. The agricultural vehicle of claim 5, wherein:

the operation part includes a pressurization mechanism configured to be lifted or lowered according to whether the clutch switch is manipulated;

the switch connecting part includes a switch hole formed in the shape of a slot in the clutch switch link part in a direction in which the clutch switch link part rotates about the connection shaft, and a switch connecting member coupled to the pressurization mechanism so as to be inserted into the switch hole;

when neither of the clutch pedal and the clutch switch is manipulated, the switch connecting member is disposed at an uppermost portion of the switch hole;

when the clutch pedal is manipulated, as the clutch link part rotates about the connection shaft, the clutch switch link part lifts the switch hole, into which the switch connecting member is inserted, so as to rotate independently of the pressurization mechanism; and when the clutch switch is manipulated, as the pressurization mechanism is lifted, the switch connecting member is lifted together with the pressurization mechanism and rotates the clutch switch link part about the connection shaft.

8. The agricultural vehicle of claim 5, wherein:

the operation part includes a pressurization mechanism configured to be lifted or lowered according to whether the clutch switch is manipulated;

the switch connecting part includes a switch hole formed in the shape of a slot in the pressurization mechanism in a direction in which the clutch switch link part rotates about the connection shaft, and a switch connecting member coupled to the clutch switch link part so as to be inserted into the switch hole;

when neither of the clutch pedal and the clutch switch is manipulated, the switch connecting member is disposed at a lowermost portion of the switch hole;

when the clutch pedal is manipulated, as the clutch switch link part rotates about the connection shaft, the clutch switch link part lifts the switch connecting member in the pedal hole so as to rotate independently of the pressurization mechanism; and when the clutch switch is manipulated, as the pressurization mechanism is lifted, the switch connecting member is lifted by being pushed by the pressurization mechanism and rotates the clutch switch link part about the connection shaft.

9. The agricultural vehicle of claim 1, wherein the clutch switch link part is coupled to the clutch link part so as to be disposed outward from the clutch pedal link part in a width direction which is perpendicular to a travel direction in which the vehicle main body travels.

10. The agricultural vehicle of claim 1, wherein:

the operation part include a pressurization mechanism connected to the clutch switch link part, a hydraulic chamber configured to lift and lower the pressurization mechanism using a working fluid, a hydraulic mechanism configured to lift and lower the pressurization mechanism by supplying the working fluid to the hydraulic chamber or discharging the working fluid from the hydraulic chamber so that the clutch switch link part rotates according to whether the clutch switch is manipulated, and a first sensing mechanism configured to sense whether the pressurization mechanism has reached a first limiting position;

as the working fluid is supplied to the hydraulic chamber, the pressurization mechanism is lifted and disengages the clutch through the clutch switch link part and the clutch link part; and when the first sensing mechanism senses that the pressurization mechanism has reached the first limiting position after being lifted, the hydraulic mechanism blocks the supply of the working fluid to the hydraulic chamber.

11. The agricultural vehicle of claim 10, wherein:

the operation part includes a second sensing mechanism configured to sense whether the pressurization mechanism has reached a second limiting position;

as the working fluid is discharged from the hydraulic chamber, the pressurization mechanism is lowered and engages the clutch through the clutch switch link part and the clutch link part; and when the second sensing mechanism senses that the pressurization mechanism has reached the second limiting position after being lowered, the hydraulic mechanism blocks the discharge of the working fluid from the hydraulic chamber.

12. The agricultural vehicle of claim 11, wherein the hydraulic mechanism includes:

a supply line connected to a hydraulic pump;

a discharge line connected to a storage tank; and a switching valve configured to be moved between a supply position at which the hydraulic chamber and the supply line are connected, a discharge position at which the hydraulic chamber and the discharge line are connected, and a blocking position at which the supply and discharge of working fluid to and from the hydraulic chamber are blocked, when the clutch is disengaged as the clutch switch is manipulated, the switching valve is placed at the supply position to allow the supply of the working fluid to the hydraulic chamber and passes the working fluid supplied from the hydraulic pump, when the first sensing mechanism senses that the pressurization mechanism has reached the first limiting position, the switching valve is moved from the supply position to the blocking position and blocks the passage of the working fluid supplied from the hydraulic pump, when the clutch is engaged as the manipulation on the clutch switch is released after the clutch switch is manipulated, the switching valve is placed at the discharge position to allow the discharge of the working fluid from the hydraulic chamber and allows the working fluid discharged from the hydraulic chamber to pass therethrough, and when the second sensing mechanism senses that the pressurization mechanism has reached the second limiting position, the switching valve is moved from the discharge position to the blocking position and blocks the passage of the working fluid discharged from the hydraulic chamber.

13. The agricultural vehicle of claim 11, wherein the hydraulic mechanism includes:

a hydraulic pump configured to supply a working fluid;

a storage tank configured to store the working fluid discharged from the hydraulic chamber;

a first switching valve configured to be moved between a supply position at which the hydraulic chamber and the hydraulic pump are connected and a supply blocking position at which the connection between the hydraulic chamber and the hydraulic pump is blocked; and a second switching valve configured to be moved between a discharge position at which the hydraulic chamber and the storage tank are connected and a discharge blocking position at which the connection between the hydraulic chamber and the storage tank is blocked, when the clutch is disengaged as the clutch switch is manipulated, the first switching valve is placed at the supply position to allow the supply of the working fluid to the hydraulic chamber and allows the working fluid supplied from the hydraulic pump to pass therethrough, when the first sensing mechanism senses that the pressurization mechanism has reached the first limiting position, the first switching valve is moved from the supply position to the supply blocking position and blocks the passage of the working fluid supplied from the hydraulic pump, when the clutch is engaged as the manipulation on the clutch switch is released after the clutch switch is manipulated, the second switching valve is placed at the discharge position to allow the discharge of the working fluid from the hydraulic chamber and allows the working fluid discharged from the hydraulic chamber to pass therethrough, and when the second sensing mechanism senses that the pressurization mechanism has reached the second limiting position, the second switching valve is moved from the discharge position to the discharge blocking position and blocks the passage of the working fluid discharged from the hydraulic chamber.

14. The agricultural vehicle of claim 1, wherein:

the operation part includes a pressurization mechanism connected to the clutch switch link part, a hydraulic chamber configured to move the pressurization mechanism using a working fluid, and a hydraulic mechanism configured to lift and lower the pressurization mechanism by supplying or discharging the working fluid to or from the hydraulic chamber so that the clutch switch link part rotates according to whether the clutch switch is manipulated; and the hydraulic mechanism includes an engagement reduction mechanism configured to decrease a discharge speed of the working fluid being discharged from the hydraulic chamber so that an engagement speed at which the clutch is engaged is lower than a disengagement speed at which the clutch is disengaged.

15. The agricultural vehicle of claim 14, wherein:

the operation part includes an adjustment mechanism connected to the engagement reduction mechanism;

the hydraulic mechanism includes a discharge line configured to allow the working fluid to be discharged from the hydraulic chamber to a storage tank;

the engagement reduction mechanism is a variable orifice coupled to the discharge line; and the adjustment mechanism adjusts a size of a passing area through which the variable orifice allows the working fluid to pass so as to adjust the discharge speed of the working fluid being discharged from the hydraulic chamber.

16. The agricultural vehicle of claim 15, wherein:

the adjustment mechanism includes a manipulating member rotatably coupled to the vehicle main body, an adjusting member coupled to the variable orifice, and a connecting member configured to connect the manipulating member and the adjusting member so that the adjusting member rotates as the manipulating member rotates;

the variable orifice includes a variable member configured to adjust the size of the passing area by moving according to a direction of rotation of the manipulating member and an angle of rotation of the manipulating member;

the adjusting member is coupled to the variable member so as to move the variable member while rotating according to the direction of rotation of the manipulating member and the angle of rotation of the manipulating member;

at least a portion of the manipulating member is disposed above a footrest provided in the vehicle main body; and the adjusting member is coupled to the variable member below the footrest.

17. The agricultural vehicle of claim 14, wherein:

the hydraulic mechanism includes a discharge line configured to allow the working fluid to be discharged from the hydraulic chamber to the storage tank, a discharge valve coupled to the discharge line and configured to selectively pass the working fluid, an elastic member configured to elastically press the discharge valve in a direction in which the discharge valve blocks passage of the working fluid, and a control line configured to press the discharge valve using a hydraulic pressure of the working fluid discharged along the discharge line in a direction in which the discharge valve allows the passage of the working fluid; and the engagement reduction mechanism is an orifice coupled to the control line so as to decrease a flow rate of the working fluid passing per unit time.

18. The agricultural vehicle of claim 17, wherein:

the hydraulic mechanism includes a support member configured to support one side of the elastic member;

the elastic member is disposed so that one side is supported by the support member and the other side presses the discharge valve;

the operation part includes an adjustment mechanism coupled to the support member;

the adjustment mechanism includes a manipulating member rotatably coupled to the vehicle main body, an adjusting member coupled to the support member, and a connecting member configured to connect the manipulating member and the adjusting member so that the adjusting member rotates as the manipulating member rotates;

the adjusting member rotates according to a direction of rotation of the manipulating member and an angle of rotation of the manipulating member and adjusts a position of the support member so as to adjust an opening time taken for the discharge valve to be placed at an opening position at which the discharge valve allows the passage of the working fluid;

at least a portion of the manipulating member is disposed above a footrest provided in the vehicle main body; and the adjusting member is coupled to the support member below the footrest.

19. The agricultural vehicle of claim 1, further comprising a footrest provided in the vehicle main body, a maintenance hole formed to pass through the footrest, and a maintenance member detachably coupled to the footrest so as to block the maintenance hole, wherein the operation part is disposed below the maintenance hole.

20. An agricultural vehicle comprising:

a vehicle main body configured to support an engine of the agricultural vehicle;

a transmission coupled to the vehicle main body and configured to perform shifting with respect to drive generated by the engine;

a clutch pedal provided in a driver's seat of the vehicle main body so that the driver is able to manipulate the clutch pedal with his or her feet;

a hand lever provided in the driver's seat so that the driver is able to manipulate the hand lever with his or her hand;

a clutch switch coupled to the hand lever;

a clutch link part configured to be rotatable about a connection shaft and connected to a clutch of the transmission so as to be engaged to and disengaged from the clutch;

a clutch pedal link part coupled to the clutch link part so as to rotate together with the clutch link part about the connection shaft;

a pedal link part connected to each of the clutch pedal link part and the clutch pedal so as to rotate the clutch link part about the connection shaft as the clutch pedal is manipulated;

a clutch switch link part coupled to the clutch link part so as to rotate together with the clutch link part about the connection shaft;

an operation part configured to rotate the clutch switch link part about the connection shaft so as to rotate the clutch link part about the connection shaft as the clutch switch is manipulated; and a switch connecting part configured to connect the clutch switch link part and the operation part so that, when the clutch pedal is manipulated, the clutch switch link part rotates independently of the operation part and, when the clutch switch is manipulated, the clutch switch link part interlocks with the operation part and rotates.

* * * * *